United States Patent
Kubo et al.

(10) Patent No.: US 11,818,466 B2
(45) Date of Patent: Nov. 14, 2023

(54) NOTIFYING APPARATUS, IMAGE CAPTURING APPARATUS, NOTIFYING METHOD, IMAGE CAPTURING METHOD, AND STORAGE MEDIUM

(71) Applicant: CANON KABUSHIKI KAISHA, Tokyo (JP)

(72) Inventors: Yukiko Kubo, Yokohama (JP); Hironori Kaida, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/941,177

(22) Filed: Sep. 9, 2022

(65) Prior Publication Data

US 2023/0007155 A1 Jan. 5, 2023

Related U.S. Application Data

(62) Division of application No. 16/728,434, filed on Dec. 27, 2019, now Pat. No. 11,463,623.

(30) Foreign Application Priority Data

Dec. 28, 2018 (JP) .................................. 2018-248373

(51) Int. Cl.
*H04N 5/335* (2011.01)
*H04N 23/68* (2023.01)
(Continued)

(52) U.S. Cl.
CPC .......... *H04N 23/689* (2023.01); *H04N 23/632* (2023.01); *H04N 23/634* (2023.01);
(Continued)

(58) Field of Classification Search
CPC ............. H04N 5/2329; H04N 5/23254; H04N 5/23264; H04N 5/232935;
(Continued)

(56) References Cited

U.S. PATENT DOCUMENTS

| | | | | |
|---|---|---|---|---|
| 6,122,446 A | * | 9/2000 | Satoh | G03B 17/00 396/55 |
| 2007/0230931 A1 | * | 10/2007 | Nomura | H04N 23/64 396/55 |
| 2019/0253630 A1 | * | 8/2019 | Kojima | H04N 23/62 |

FOREIGN PATENT DOCUMENTS

| | | |
|---|---|---|
| JP | 2005-210392 A | 8/2005 |
| JP | 2006-091398 A | 4/2006 |

(Continued)

OTHER PUBLICATIONS

The above foreign patent documents were cited in the Nov. 4, 2022 Japanese Office Action, which is enclosed without an English Translation, that issued in Japanese Patent Application No. 2018-248373.

*Primary Examiner* — Gary C Vieaux
(74) *Attorney, Agent, or Firm* — Cowan, Liebowitz & Latman, P.C.

(57) ABSTRACT

There is provided a notifying apparatus. A detecting unit detects a motion amount of an object from an image obtained through first shooting, the first shooting being carried out repeatedly at predetermined intervals of time. A converting unit converts the motion amount into a motion blur amount that will arise in second shooting, on the basis of the predetermined intervals of time and an exposure time used in the second shooting. A notifying unit makes a notification of motion blur on the basis of the motion blur amount. The notifying unit changes a form of the notification in accordance with a magnitude of the motion blur amount.

10 Claims, 23 Drawing Sheets

MOTION VECTORS

(51) Int. Cl.
*H04N 23/73* (2023.01)
*H04N 23/63* (2023.01)

(52) U.S. Cl.
CPC ....... *H04N 23/682* (2023.01); *H04N 23/6811* (2023.01); *H04N 23/73* (2023.01)

(58) Field of Classification Search
CPC ........... H04N 5/232941; H04N 5/2353; H04N 23/689; H04N 23/632; H04N 23/634; H04N 23/6811; H04N 23/682; H04N 23/73; H04N 23/6812
See application file for complete search history.

(56) References Cited

FOREIGN PATENT DOCUMENTS

| | | |
|---|---|---|
| JP | 2008-172667 A | 7/2008 |
| JP | 2010-160178 A | 7/2010 |

* cited by examiner

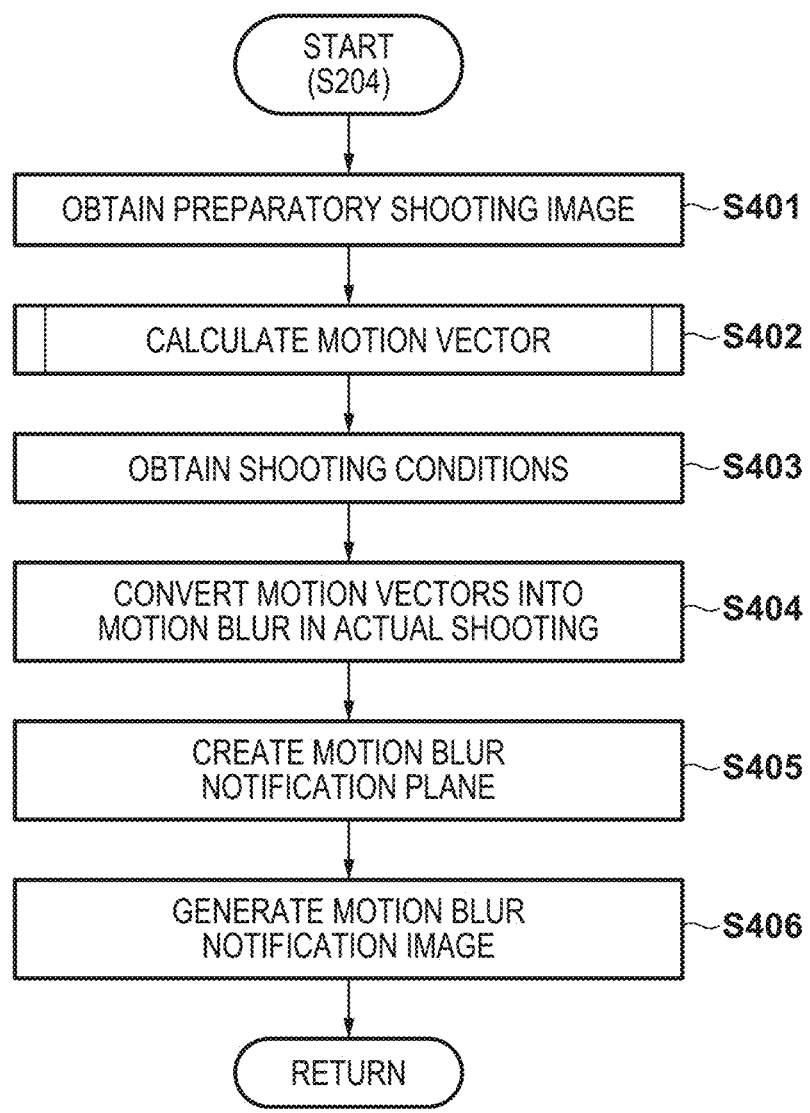

PREPARATORY SHOOTING IMAGE

MOTION VECTORS

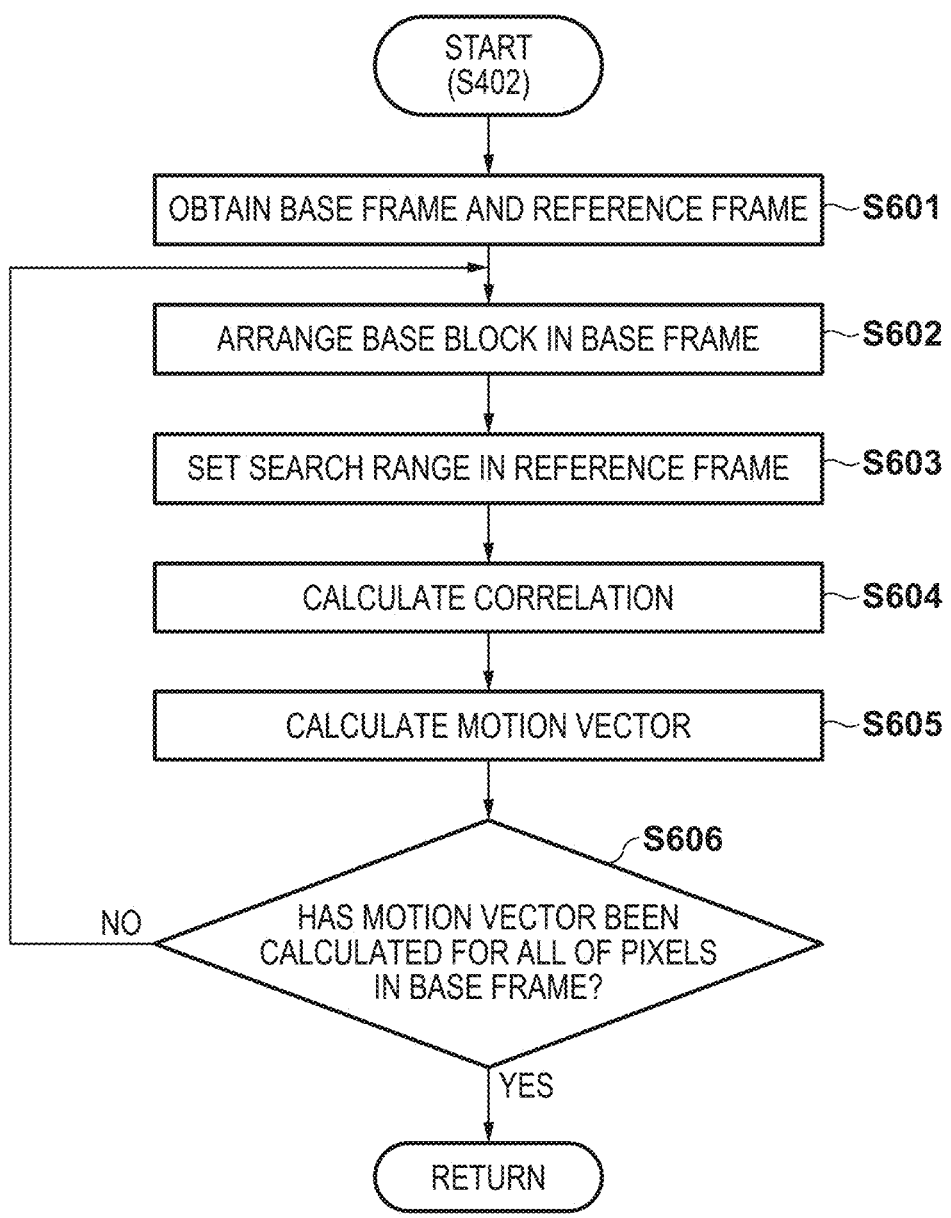

MOTION BLUR NOTIFICATION ICON

MOTION BLUR NOTIFICATION ICON

MOTION BLUR NOTIFICATION ICON

MOTION BLUR NOTIFICATION FRAME

MOTION BLUR NOTIFICATION EDGE

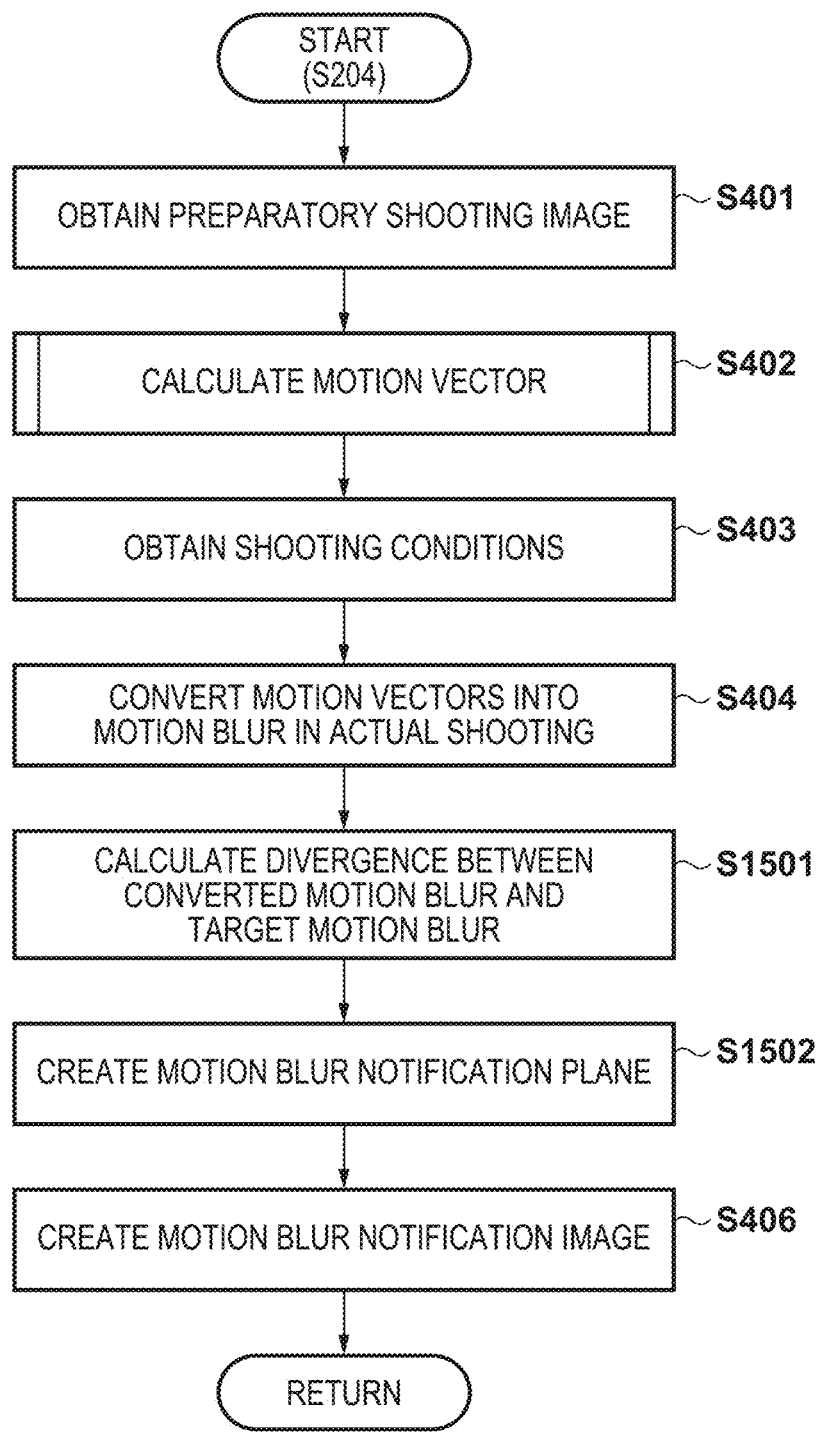

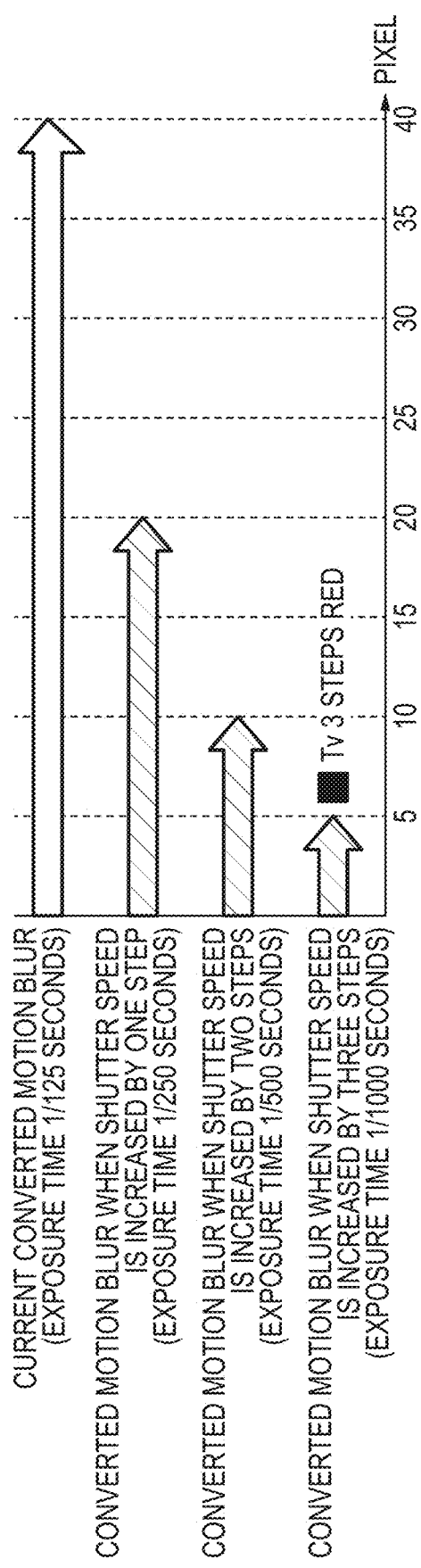
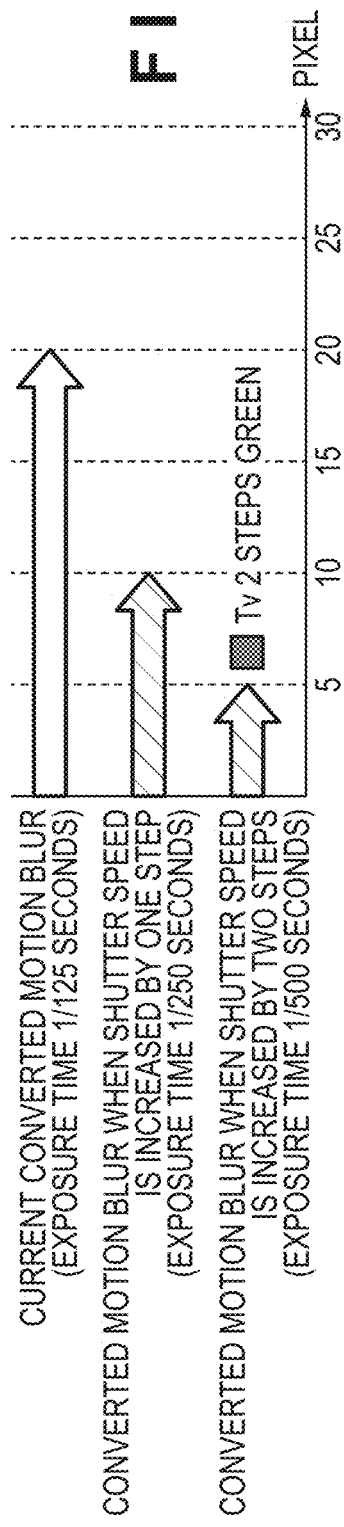
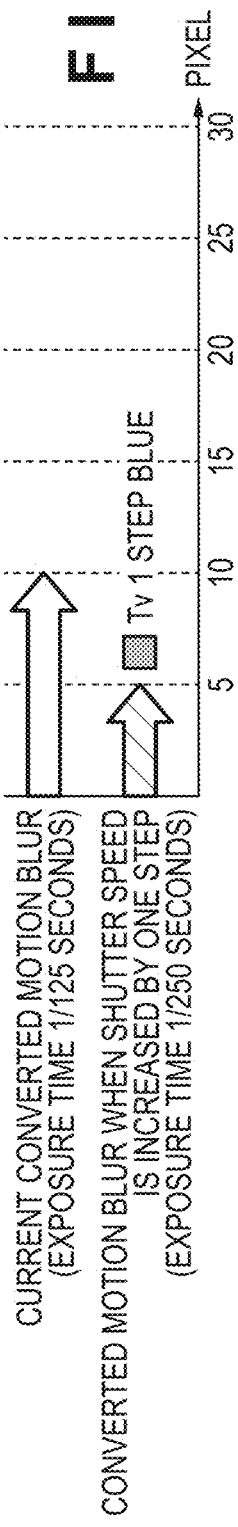

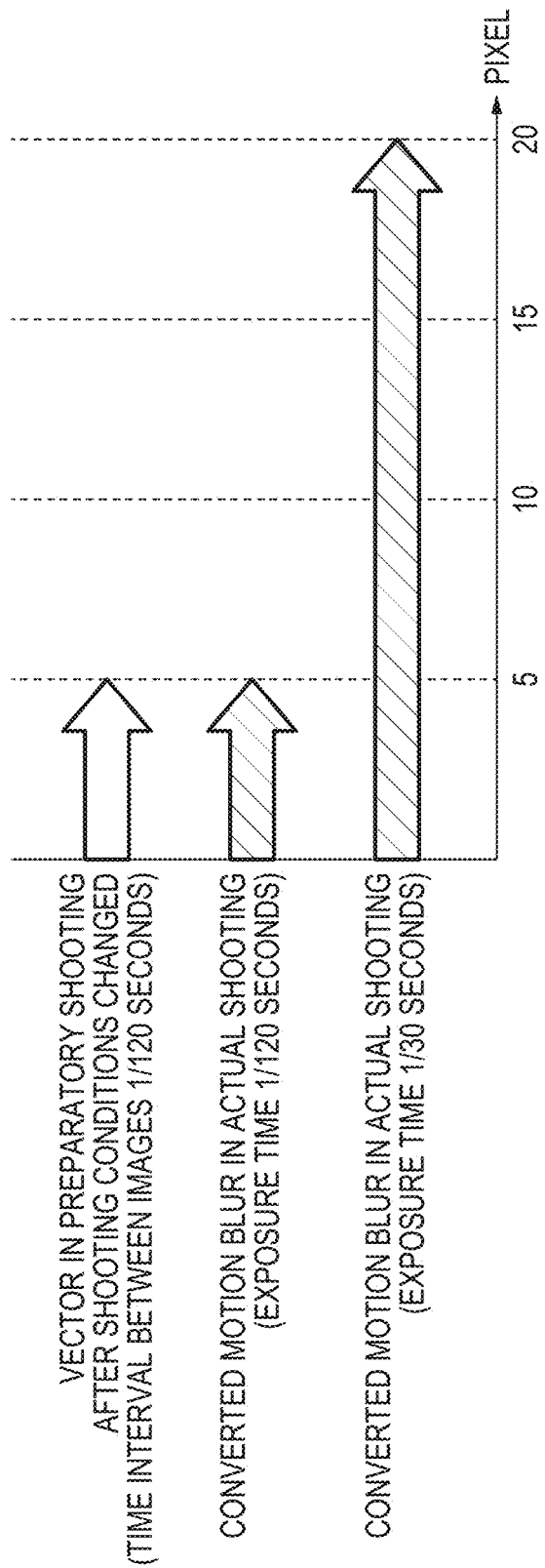

NOTIFYING APPARATUS, IMAGE CAPTURING APPARATUS, NOTIFYING METHOD, IMAGE CAPTURING METHOD, AND STORAGE MEDIUM

CROSS-REFERENCE TO RELATED APPLICATIONS

This application is a divisional of application Ser. No. 16/728,434, filed Dec. 27, 2019, the entire disclosure of which is hereby incorporated by reference.

BACKGROUND OF THE INVENTION

Field of the Invention

The present invention relates to a notifying apparatus, an image capturing apparatus, a notifying method, an image capturing method, and a storage medium.

Description of the Related Art

Recently, some commercial models of image capturing apparatuses such as digital still cameras are provided with a shooting mode called "shutter speed priority mode". The shutter speed priority mode is a shooting mode in which the photographer sets a desired shutter speed, and the image capturing apparatus then automatically sets exposure setting values aside from the shutter speed, such as the aperture value, ISO sensitivity, and so on. The photographer can shoot an image at his or her preferred shutter speed by using the shutter speed priority mode in this manner. For example, setting a fast shutter speed before shooting an image and then shooting the image in the shutter speed priority mode makes it possible to shoot an image having little motion blur.

Japanese Patent Laid-Open No. 2008-172667 discloses a technique that makes it possible for a photographer to visually confirm a motion region during preparatory shooting. "Preparatory shooting" refers to shooting carried out by the photographer to compose the shot, set the shooting conditions, and so on while looking at an electronic viewfinder or rear surface LCD of the image capturing apparatus. According to the technique disclosed in Japanese Patent Laid-Open No. 2008-172667, a motion region is detected between time-series images capturing during preparatory shooting, and that motion region is displayed in an emphasized manner.

As described above, to shoot an image with little motion blur, it is necessary to shoot the image using a fast shutter speed. However, even if a fast shutter speed is set during preparatory shooting and the actual shooting is carried out using the shutter speed priority mode, there are situations where an object will be captured in a blurry state.

For example, when shooting a footrace runner in the shutter speed priority mode so that little motion blur arises, the photographer estimates the speed at which the runner is moving during the preparatory shooting, and sets a shutter speed he or she thinks will result in little motion blur for the runner. However, it is difficult for the photographer to confirm whether or not motion blur is arising at the set shutter speed, even if he or she visually confirms the image displayed in an electronic viewfinder or rear surface LCD during preparatory shooting. Specifically, it is difficult for the photographer to visually confirm motion blur in small regions, such as the arms and legs of the runner, during the preparatory shooting. Furthermore, if the shutter speed differs between the actual shooting and the preparatory shooting, the motion blur will also be different between the actual shooting and the preparatory shooting, and it is therefore difficult to confirm motion blur in the actual shooting even when the image has been visually confirmed during the preparatory shooting. Thus when taking an actual shot at the set shutter speed, the runner will be blurred in the captured image if the shutter speed is too slow relative to the speed at which the runner is moving.

Furthermore, in this conventional technique, it is not easy for the photographer to know how much motion blur will arise in the actual shooting in advance.

SUMMARY OF THE INVENTION

Having been achieved in light of such circumstances, the present invention provides a technique that makes it easy for a photographer to know how much motion blur will arise in actual shooting in advance.

According to a first aspect of the present invention, there is provided a notifying apparatus comprising at least one processor and/or at least one circuit which functions as: a detecting unit configured to detect a motion amount of an object from an image obtained through first shooting, the first shooting being carried out repeatedly at predetermined intervals of time; a converting unit configured to convert the motion amount into a motion blur amount that will arise in second shooting, on the basis of the predetermined intervals of time and an exposure time used in the second shooting; and a notifying unit configured to make a notification of motion blur on the basis of the motion blur amount, wherein the notifying unit changes a form of the notification in accordance with a magnitude of the motion blur amount.

According to a second aspect of the present invention, there is provided a notifying apparatus comprising at least one processor and/or at least one circuit which functions as: a detecting unit configured to detect, in a predetermined period, a motion amount of an image capturing apparatus carrying out first shooting that is carried out repeatedly at predetermined intervals of time; a converting unit configured to convert the motion amount into a motion blur amount that will arise in second shooting, on the basis of the predetermined period and an exposure time used in the second shooting; and a notifying unit configured to make a notification of motion blur on the basis of the motion blur amount, wherein the notifying unit changes a form of the notification in accordance with a magnitude of the motion blur amount.

According to a third aspect of the present invention, there is provided a notifying apparatus comprising at least one processor and/or at least one circuit which functions as: a detecting unit configured to detect a motion amount of an object from an image obtained through first shooting, the first shooting being carried out repeatedly at predetermined intervals of time; a converting unit configured to convert the motion amount into a motion blur amount that will arise in second shooting, on the basis of the predetermined intervals of time and an exposure time used in the second shooting; and a notifying unit configured to make a notification of motion blur on the basis of the motion blur amount, wherein the notifying unit changes a form of the notification in accordance with a divergence between the motion blur amount and a target motion blur amount.

According to a fourth aspect of the present invention, there is provided an image capturing apparatus comprising: the notifying apparatus according to the first aspect; and an image sensor.

According to a fifth aspect of the present invention, there is provided an image capturing apparatus comprising: the notifying apparatus according to the second aspect; and an image sensor.

According to a sixth aspect of the present invention, there is provided an image capturing apparatus comprising: the notifying apparatus according to the third aspect; and an image sensor.

According to a seventh aspect of the present invention, there is provided an image capturing apparatus comprising at least one processor and/or at least one circuit which functions as: an image capturing control unit configured to control an image sensor to carry out first shooting repeatedly at a predetermined framerate; a detecting unit configured to detect a motion amount of an object from an image obtained through the first shooting; a changing unit configured to change the predetermined framerate on the basis of a difference between the motion amount and a target motion blur amount; a converting unit configured to convert the motion amount into a motion blur amount that will arise in second shooting, on the basis of the predetermined framerate and an exposure time used in the second shooting; and a notifying unit configured to make a notification of motion blur on the basis of the motion blur amount.

According to an eighth aspect of the present invention, there is provided a notifying method executed by a notifying apparatus, comprising: detecting a motion amount of an object from an image obtained through first shooting, the first shooting being carried out repeatedly at predetermined intervals of time; converting the motion amount into a motion blur amount that will arise in second shooting, on the basis of the predetermined intervals of time and an exposure time used in the second shooting; and making a notification of motion blur on the basis of the motion blur amount, wherein a form of the notification is changed in accordance with a magnitude of the motion blur amount.

According to a ninth aspect of the present invention, there is provided a notifying method executed by a notifying apparatus, comprising: detecting, in a predetermined period, a motion amount of an image capturing apparatus carrying out first shooting that is carried out repeatedly at predetermined intervals of time; converting the motion amount into a motion blur amount that will arise in second shooting, on the basis of the predetermined period and an exposure time used in the second shooting; and making a notification of motion blur on the basis of the motion blur amount, wherein a form of the notification is changed in accordance with a magnitude of the motion blur amount.

According to a tenth aspect of the present invention, there is provided a notifying method executed by a notifying apparatus, comprising: detecting a motion amount of an object from an image obtained through first shooting, the first shooting being carried out repeatedly at predetermined intervals of time; converting the motion amount into a motion blur amount that will arise in second shooting, on the basis of the predetermined intervals of time and an exposure time used in the second shooting; and making a notification of motion blur on the basis of the motion blur amount, wherein a form of the notification is changed in accordance with a divergence between the motion blur amount and a target motion blur amount.

According to an eleventh aspect of the present invention, there is provided an image capturing method executed by an image capturing apparatus, comprising: controlling an image sensor to carry out first shooting repeatedly at a predetermined framerate; detecting a motion amount of an object from an image obtained through the first shooting; changing the predetermined framerate on the basis of a difference between the motion amount and a target motion blur amount; converting the motion amount into a motion blur amount that will arise in second shooting, on the basis of the predetermined framerate and an exposure time used in the second shooting; and making a notification of motion blur on the basis of the motion blur amount.

According to a twelfth aspect of the present invention, there is provided a non-transitory computer-readable storage medium which stores a program for causing a computer to execute a notifying method comprising: detecting a motion amount of an object from an image obtained through first shooting, the first shooting being carried out repeatedly at predetermined intervals of time; converting the motion amount into a motion blur amount that will arise in second shooting, on the basis of the predetermined intervals of time and an exposure time used in the second shooting; and making a notification of motion blur on the basis of the motion blur amount, wherein a form of the notification is changed in accordance with a magnitude of the motion blur amount.

According to a thirteenth aspect of the present invention, there is provided a non-transitory computer-readable storage medium which stores a program for causing a computer to execute a notifying method comprising: detecting, in a predetermined period, a motion amount of an image capturing apparatus carrying out first shooting that is carried out repeatedly at predetermined intervals of time; converting the motion amount into a motion blur amount that will arise in second shooting, on the basis of the predetermined period and an exposure time used in the second shooting; and making a notification of motion blur on the basis of the motion blur amount, wherein a form of the notification is changed in accordance with a magnitude of the motion blur amount.

According to a fourteenth aspect of the present invention, there is provided a non-transitory computer-readable storage medium which stores a program for causing a computer to execute a notifying method comprising: detecting a motion amount of an object from an image obtained through first shooting, the first shooting being carried out repeatedly at predetermined intervals of time; converting the motion amount into a motion blur amount that will arise in second shooting, on the basis of the predetermined intervals of time and an exposure time used in the second shooting; and making a notification of motion blur on the basis of the motion blur amount, wherein a form of the notification is changed in accordance with a divergence between the motion blur amount and a target motion blur amount.

According to a fifteenth aspect of the present invention, there is provided a non-transitory computer-readable storage medium which stores a program for causing a computer to execute an image capturing method comprising: controlling an image sensor to carry out first shooting repeatedly at a predetermined framerate; detecting a motion amount of an object from an image obtained through the first shooting; changing the predetermined framerate on the basis of a difference between the motion amount and a target motion blur amount; converting the motion amount into a motion blur amount that will arise in second shooting, on the basis of the predetermined framerate and an exposure time used in the second shooting; and making a notification of motion blur on the basis of the motion blur amount.

Further features of the present invention will become apparent from the following description of exemplary embodiments with reference to the attached drawings.

BRIEF DESCRIPTION OF THE DRAWINGS

FIG. 4 is a flowchart illustrating a process by which the notification image generating unit 300 generates a motion blur notification image (step S204 in FIG. 2).

FIG. 6 is a flowchart illustrating a motion vector calculation process (step S402 in FIG. 4).

FIG. 15 is a flowchart illustrating a process by which the notification image generating unit 1400 generates a motion blur notification image (step S204 in FIG. 2).

FIGS. 16A to 16C are diagrams illustrating converted motion blur corresponding to the current shutter speed (exposure time) in actual shooting, and converted motion blur when the shutter speed (exposure time) has been changed.

FIG. 24 is a diagram illustrating a motion vector in preparatory shooting, and motion blur, in actual shooting, converted from the motion vector in the preparatory shooting (converted motion blur).

DESCRIPTION OF THE EMBODIMENTS

Figure 1:
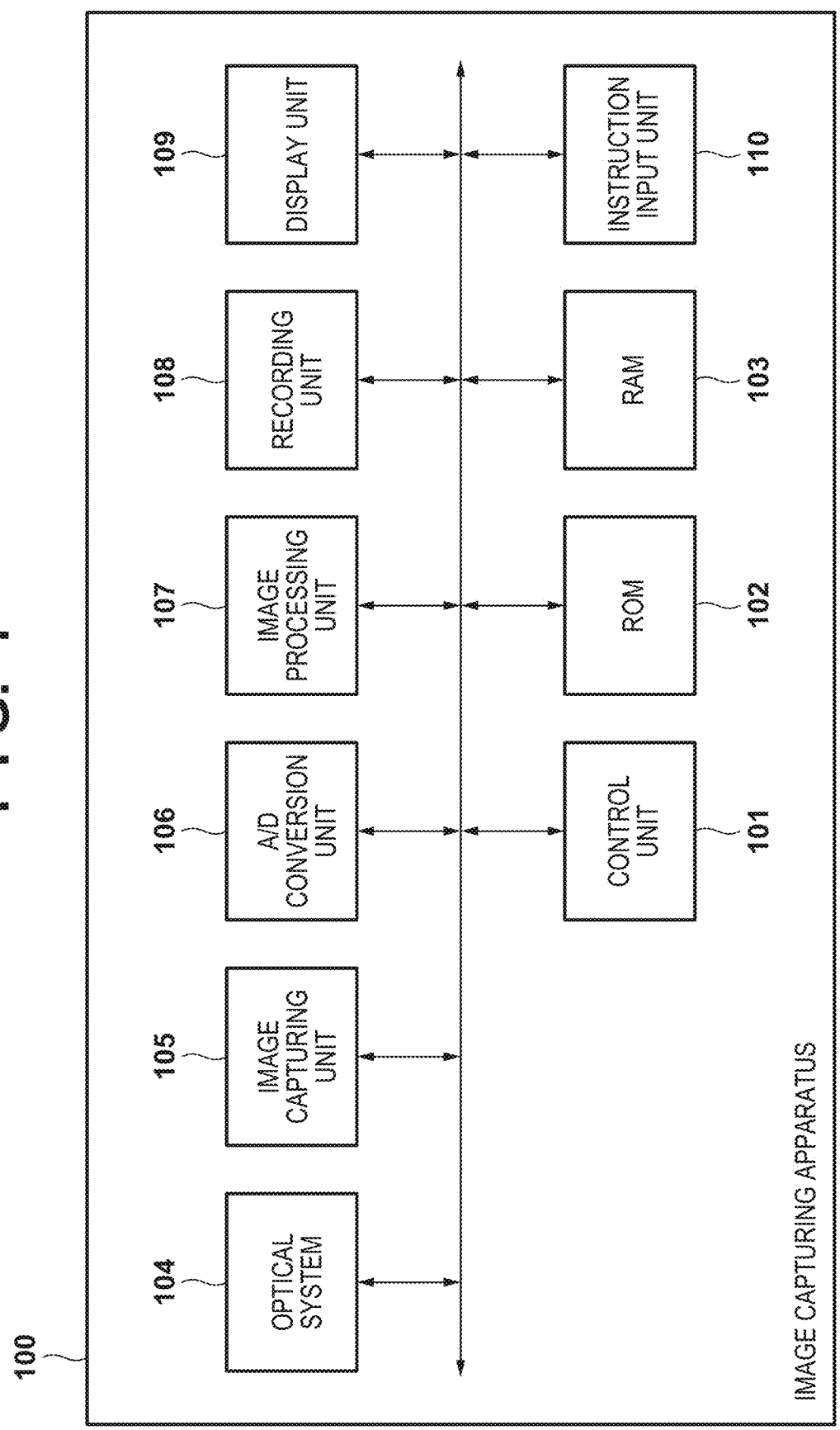
FIG. 1 is a block diagram illustrating the configuration of an image capturing apparatus 100 including a notifying apparatus.

Hereinafter, embodiments of the present invention will be described with reference to the attached drawings. Elements that are given the same reference numerals throughout all of the attached drawings represent the same or similar elements, unless otherwise specified. Note that the technical scope of the present invention is defined by the claims, and is not limited by the following respective embodiments. Also, not all of the combinations of the aspects that are described in the embodiments are necessarily essential to the present invention. Also, the aspects that are described in the individual embodiments can be combined as appropriate.

First Embodiment

FIG. 1 is a block diagram illustrating the configuration of an image capturing apparatus 100 including a notifying apparatus. The first embodiment will describe a configuration that switches a motion blur notification on and off.

A control unit 101 is a CPU, for example; the control unit 101 reads out control programs for controlling the various blocks of the image capturing apparatus 100 from ROM 102 (described later), loads the programs into RAM 103 (described later), and executes the programs. Through this, the control unit 101 can control the operations of the various blocks of the image capturing apparatus 100. The ROM 102 is electrically erasable/recordable non-volatile memory, and stores parameters and the like necessary for each of the blocks of the image capturing apparatus 100 to function, in addition to the control programs for controlling those blocks. The RAM 103 is rewritable volatile memory, and is used for loading the control programs executed by the control unit 101 and the like, temporarily storing data generated through the operations of the blocks of the image capturing apparatus 100, and the like.

An optical system 104 is constituted by a lens group including a zoom lens and a focus lens, and forms a subject image on an image capturing surface of an image capturing unit 105, which will be described later. The image capturing unit 105 is an image sensor such as a CCD or a CMOS sensor; the image capturing unit 105 photoelectrically converts an optical image formed on the image capturing surface of the image capturing unit 105 by the optical system 104 and outputs an analog image signal obtained as a result to an A/D conversion unit 106. The A/D conversion unit 106 converts the input analog image signal into digital image data. The digital image data output from the A/D conversion unit 106 is temporarily stored in the RAM 103.

An image processing unit 107 applies various types of image processing, such as white balance adjustment, color interpolation, and gamma processing, to the image data stored in the RAM 103. The image processing unit 107 also includes a notification image generating unit 300 (described later), which generates a motion blur notification image by superimposing an image plane enabling motion blur to be easily confirmed over an image stored in the RAM 103.

A recording unit 108 is a removable memory card or the like. The recording unit 108 records the image data processed by the image processing unit 107 as a recorded image, via the RAM 103. A display unit 109 is a display device such as an LCD; the display unit 109 displays images stored in the RAM 103, images recorded into the recording unit 108, a user interface for operations for accepting instructions from the user, and so on. The display unit 109 also displays images captured by the image capturing unit 105, for composing the shot and the like during preparatory shooting. An instruction input unit 110 is a touch panel, a mouse, or the like. The user inputs instructions to the image capturing apparatus 100 using the instruction input unit 110.

A shooting process executed by the image capturing apparatus 100 will be described next with reference to FIG. 2. Unless otherwise specified, the processes in the respective steps of this flowchart are realized by the control unit 101 executing the aforementioned control programs. The processing illustrated in this flowchart starts when the user turns the image capturing apparatus 100 on and an operating mode of the image capturing apparatus 100 enters a shooting mode.

In step S201, the control unit 101 starts preparatory shooting (first shooting). During the period of the preparatory shooting, the image capturing apparatus 100 captures images in sequence, in the same manner as a moving image (a preparatory shooting image), and displays that image in the display unit 109. In other words, during the period of the preparatory shooting, the preparatory shooting is carried out repeatedly at predetermined intervals of time. The user composes the shot and so on while viewing the display preparatory shooting image. Note that the processes of steps S202 to S206 (described hereinafter) are carried out during the period of preparatory shooting.

In step S202, the control unit 101 sets shooting conditions for actual shooting (second shooting) in response to user instructions (user operations) made using the instruction input unit 110. The shooting conditions include exposure conditions, and the exposure conditions include the shutter speed (exposure time), ISO sensitivity, F-stop value, and so on. Note that the shooting conditions for the actual shooting may be automatically set by the control unit 101.

In step S203, the control unit 101 determines whether to turn a motion blur notification on or off. Turning the motion blur notification on or off can be set by the user using the instruction input unit 110, for example. When the user sets the motion blur notification on or off, a setting value indicating on or off is held in the RAM 103. The control unit 101 determines whether the motion blur notification is on or off in accordance with this setting value. If it has been determined that the motion blur notification is on, the process moves to step S204, and if not, the process moves to step S205.

In step S204, under the control of the control unit 101, the notification image generating unit 300 generates the motion blur notification image by superimposing a motion blur notification plane onto the preparatory shooting image. In other words, the motion blur notification image is a preparatory shooting image with the motion blur notification plane superimposed thereon. The process of step S204 will be described in detail later with reference to FIG. 4.

In step S205, the control unit 101 displays an image in the display unit 109. Specifically, when the motion blur notification image has been generated in step S204 (when it has been determined in step S203 that the motion blur notification is on), the control unit 101 displays the motion blur notification image (the preparatory shooting image onto which the motion blur notification plane has been superimposed) in the display unit 109. When the motion blur notification image has not been generated (when it has been determined in step S203 that the motion blur notification is off), the control unit 101 displays the preparatory shooting image (the preparatory shooting image onto which the motion blur notification plane has not been superimposed) in the display unit 109.

In step S206, the control unit 101 determines whether or not the user has pressed a shutter button. The shutter button is included in the instruction input unit 110, for example. If the shutter button has been pressed, the process moves to step S207, and if not, the process returns to step S202.

While viewing the preparatory shooting image or the motion blur notification image displayed in the display unit 109, the user can press the shutter button when he or she has the chance to take a shot. The user can easily confirm motion blur during the preparatory shooting when the motion blur notification image is being displayed in the display unit 109. If the motion blur the user has confirmed is not motion blur that meets his or her preferences, the user can avoid pressing the shutter button, which returns the process to step S202 and makes it possible to change (reset) the shutter speed (exposure time) for the actual shooting. In this manner, during the preparatory shooting, the user can repeatedly change the shutter speed (exposure time) for the actual shooting while confirming the motion blur notification image displayed in the display unit 109 until the motion blur that meets his or her preferences is achieved, and can then press the shutter button when there is a chance to take a shot.

When the shutter button is pressed in step S206, the control unit 101 carries out actual shooting, and records the image from the actual shooting in the recording unit 108, in step S207.

An example of the configuration of the notification image generating unit 300 included in the image processing unit 107 will be described next with reference to FIG. 3. The notification image generating unit 300 includes a motion vector calculation unit 301, a converted motion blur calculation unit 302, a motion blur notification plane generation unit 303, and an image superimposing unit 304. The operations of the notification image generating unit 300 will be described in detail later with reference to FIG. 4.

Next, the process by which the notification image generating unit 300 generates the motion blur notification image (step S204 in FIG. 2) will be described in detail with reference to FIG. 4.

In step S401, the notification image generating unit 300 obtains the preparatory shooting image captured during the preparatory shooting by the image capturing apparatus 100. The obtained preparatory shooting image is input to the motion vector calculation unit 301 and the image superimposing unit 304.

Figure 5A:
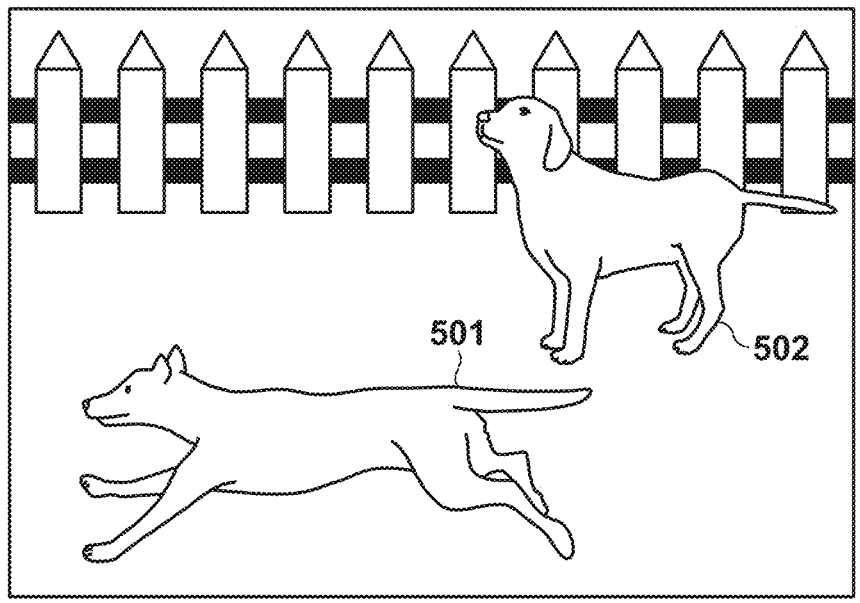
FIG. 5A is a diagram illustrating an example of a preparatory shooting image.

FIG. 5A is a diagram illustrating an example of the preparatory shooting image. The present embodiment will describe an example in which, as illustrated in FIG. 5A, a scene is shot in which a dog 501 is running to the left and a dog 502 is standing still.

In step S402, the motion vector calculation unit 301 calculates a motion vector between the preparatory shooting images as motion information. A "motion vector" expresses horizontal and vertical direction movement amounts of an object between preparatory shooting images as a vector. The method for calculating the motion vector will be described in detail later with reference to FIGS. 6 and 7.

FIG. 6 is a flowchart illustrating the motion vector calculation process carried out by the motion vector calculation unit 301 (step S402 in FIG. 4). Although the present embodiment will describe a block matching method as an example of the method for calculating the motion vector, the method for calculating the motion vector is not limited to this example, and may be gradient method instead, for example.

In step S601, the motion vector calculation unit 301 obtains two preparatory shooting images adjacent with respect to time. The motion vector calculation unit 301 then sets the preparatory shooting image from an Mth frame as a base frame, and sets the preparatory shooting image from an M+1th frame as a reference frame.

Figure 7:
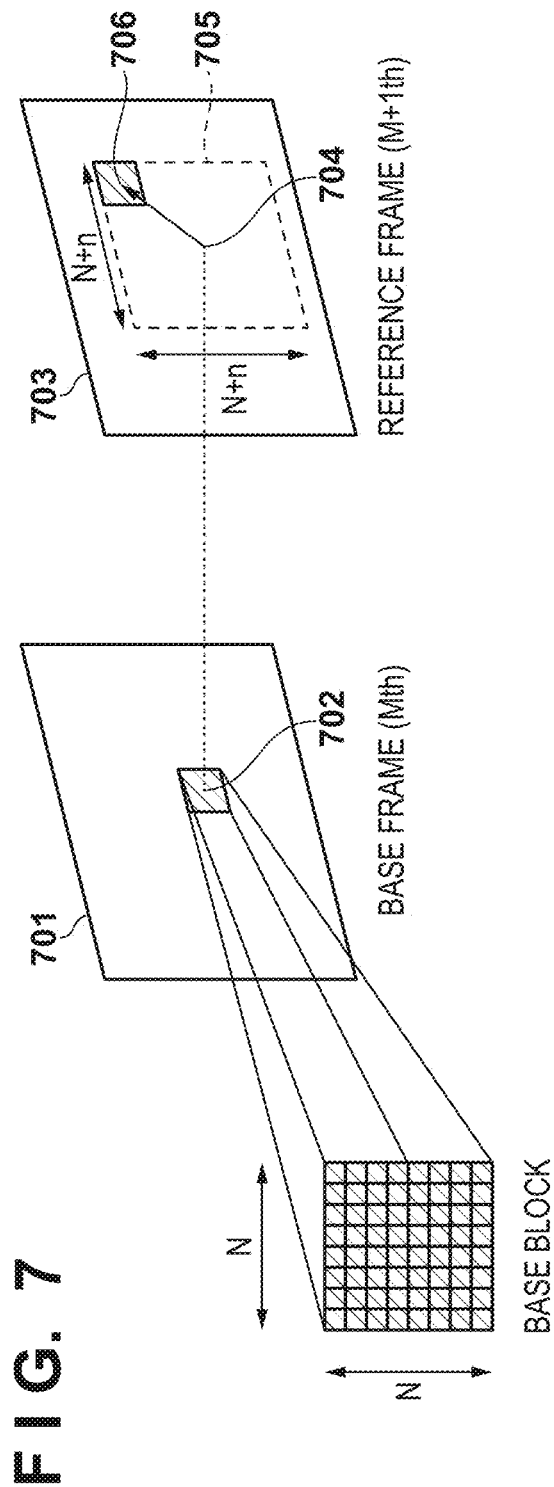
FIG. 7 is a diagram illustrating the motion vector calculation process (step S402 in FIG. 4).

As illustrated in FIG. 7, in step S602, the motion vector calculation unit 301 arranges a base block 702, made up of N×N pixels, in a base frame 701.

Also as illustrated in FIG. 7, in step S603, the motion vector calculation unit 301 sets pixels (N+n)×(N+n), which surround coordinates 704 that match the center coordinates of the base block 702 in the base frame 701, in a reference frame 703 as a search range 705.

In step S604, the motion vector calculation unit 301 calculates the correlation between the base block 702 in the base frame 701, and an N×N-pixel reference block 706 at coordinates present within the search range 705 in the reference frame 703, to calculate a correlation value. The correlation value is calculated on the basis of an inter-frame difference absolute value sum for the pixels in the base block 702 and the reference blocks 706. In other words, the coordinates where the value of the inter-frame difference absolute value sum is lowest are the coordinates where the correlation value is the highest. Note that the method for calculating the correlation value is not limited to a method that finds the inter-frame difference absolute value sum, and may instead be a method for calculating the correlation value on the basis of an inter-frame difference sum of squares, a normal cross-correlation value, or the like, for example. The example in FIG. 7 indicates that the reference blocks 706 has the highest correlation.

In step S605, the motion vector calculation unit 301 calculates the motion vector on the basis of the reference block coordinates indicating the highest correlation value found in step S604. In the example in FIG. 7, the motion vector is found on the basis of the coordinates 704 corresponding to the center coordinates of the base block 702 in the base frame 701, and the center coordinates of the reference block 706, in the search range 705 of the reference frame 703. In other words, the inter-coordinate distance and direction, from the coordinates 704 to the center coordinates of the reference block 706, are found as the motion vector.

In step S606, the motion vector calculation unit 301 determines whether or not a motion vector has been calculated for all of the pixels in the base frame 701. If the motion vector calculation unit 301 has determined in step S606 that a motion vector has not been calculated for all of the pixels, the process returns to step S602, whereas if the motion vector calculation unit 301 has determined that a motion vector has been calculated for all of the pixels, the process returns to the flowchart of FIG. 4.

When the process returns to step S602, the motion vector calculation unit 301 arranges an N×N-pixel base block 702 in the aforementioned base frame 701, central to a pixel for which a motion vector has not yet been calculated. The processing from steps S603 to S605 is then carried out in the same manner as described earlier. In other words, the motion vector calculation unit 301 calculates motion vectors for all of the pixels in the base frame 701 by repeating the processing from steps S602 to S605 while moving the base block 702 in FIG. 7.

Figure 5B:
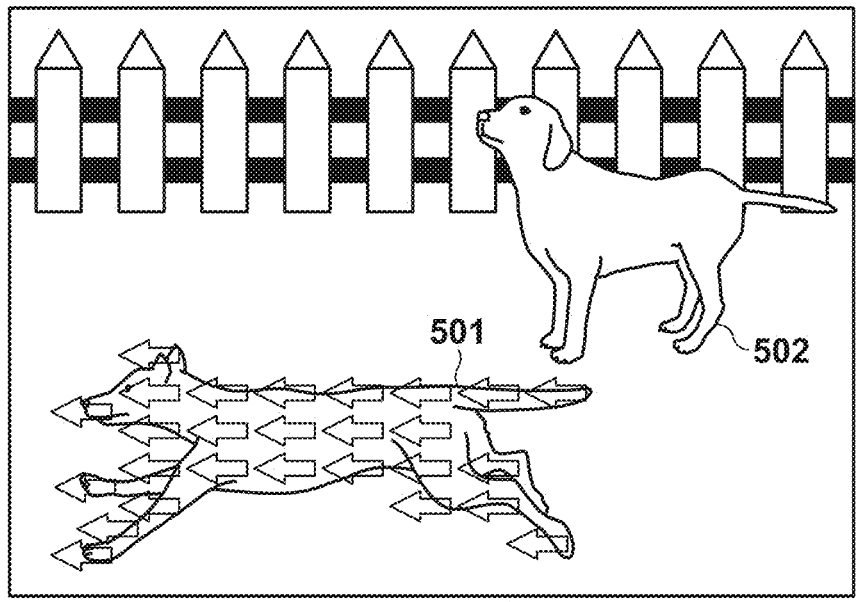
FIG. 5B is a diagram illustrating an example of motion vectors in a preparatory shooting image.

FIG. 5B illustrates an example of the motion vectors calculated in this manner. FIG. 5B is a diagram illustrating an example of motion vectors in the preparatory shooting image indicated in FIG. 5A. The preparatory shooting image in FIG. 5A is an example in which the dog 501 is running to the left. FIG. 5B illustrates an example of the motion vectors in the case where an object is moving in this manner. In the example illustrated in FIG. 5B, leftward motion vectors are detected in the region corresponding to the running dog 501, whereas "0" is detected as the motion vectors in other regions, such as the dog 502 that is standing still, the fence in the background, and so on. The motion vectors of "0" are not illustrated.

Note that the motion vector calculation unit 301 may calculate a motion vector every predetermined number of pixels instead of calculating motion vectors for all of the pixels.

The motion vector calculation unit 301 calculates the motion vectors between preparatory shooting images adjacent with respect to time through the foregoing processing.

Figure 2:
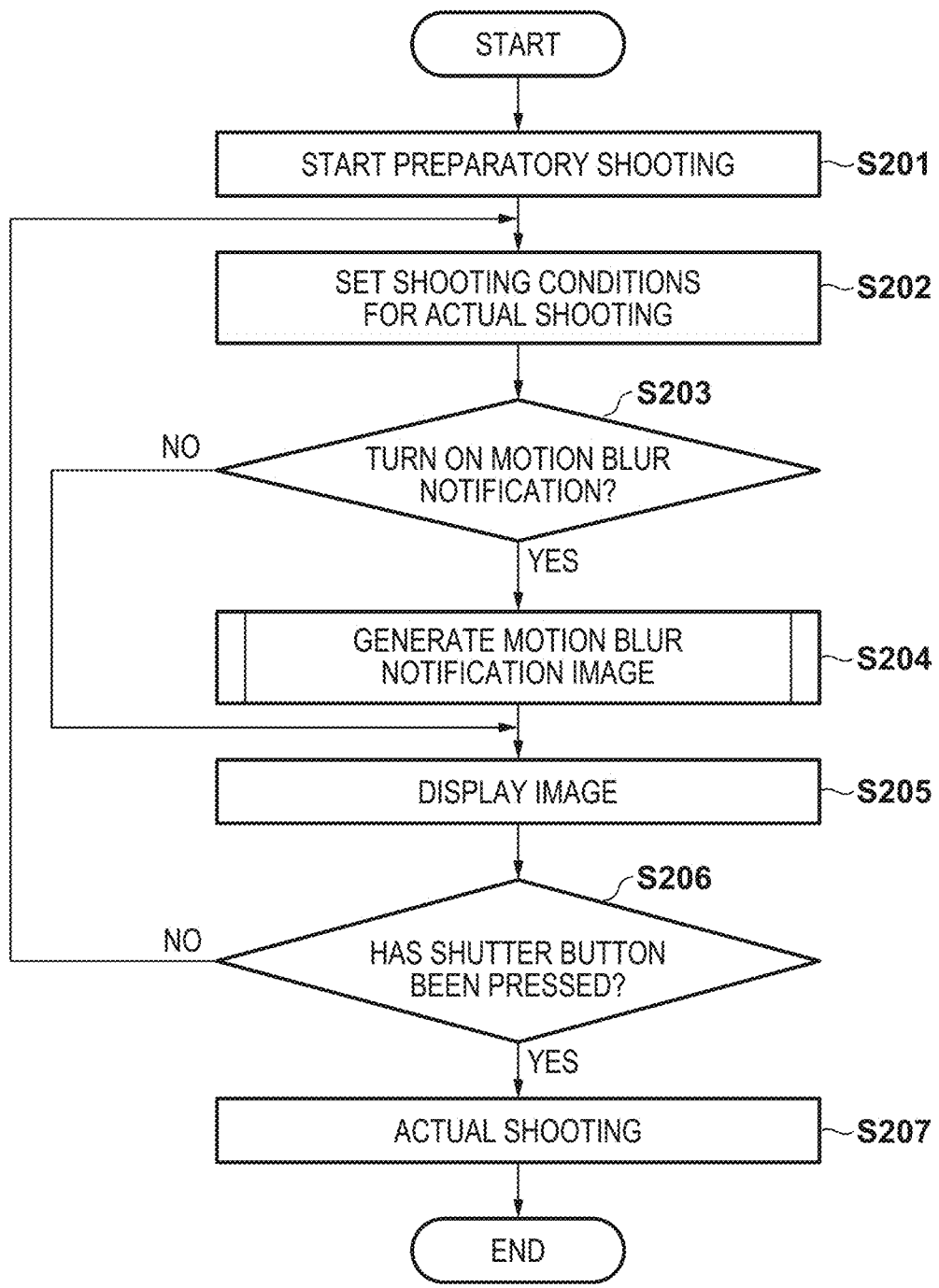
FIG. 2 is a flowchart illustrating a shooting process according to a first embodiment.

Returning to FIG. 4, in step S403, the converted motion blur calculation unit 302 obtains the shutter speed (exposure time) for the actual shooting set in step S202 of FIG. 2, and the time interval between the images in the preparatory shooting, as the shooting conditions.

In step S404, the converted motion blur calculation unit 302 converts the motion vectors for each pixel, calculated in step S402, into motion blur in the actual shooting, on the basis of the exposure time for the actual shooting and the time interval between the images in the preparatory shooting, which were obtained in step S403. The method for converting the motion vectors from the preparatory shooting into the motion blur in the actual shooting will be described in detail with reference to FIG. 8.

Figure 8:
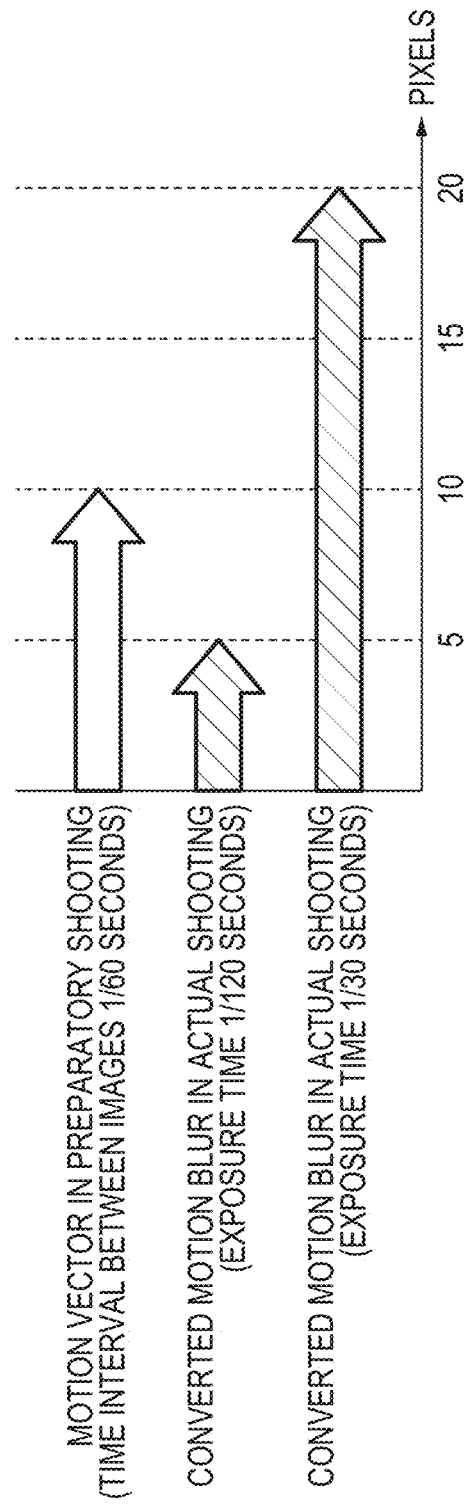
FIG. 8 is a diagram illustrating a motion vector in preparatory shooting, and motion blur, in actual shooting, converted from the motion vector in the preparatory shooting (converted motion blur).

FIG. 8 is a diagram illustrating a motion vector in preparatory shooting, and motion blur, in actual shooting, converted from the motion vector in the preparatory shooting (converted motion blur). FIG. 8 illustrates an example in which the time interval between the images in the preparatory shooting is 1/60 seconds, and the exposure time in the actual shooting is 1/120 seconds or 1/30 seconds.

The converted motion blur calculation unit 302 converts the motion vector for each pixel into motion blur in the actual shooting on the basis of the following conversion equations (1) and (2).

$$CONV\_GAIN = EXP\_TIME / INT\_TIME \tag{1}$$

$$CONV\_BLUR = VEC\_LEN \times CONV\_GAIN \tag{2}$$

Here, in Equation (1), CONV_GAIN represents a conversion gain for converting the motion vector in the preparatory shooting into a motion vector in the actual shooting, EXP_TIME represents the exposure time in the actual shooting, and INT_TIME represents the time interval between images in the preparatory shooting. In Equation (2), CONV_BLUR represents the converted motion blur in the actual shooting, and VEC_LEN indicates the length of the motion vector in the preparatory shooting.

In Equation (1), the conversion gain CONV_GAIN is calculated by dividing the exposure time EXP_TIME in the actual shooting by the time interval INT_TIME between images in the preparatory shooting. In Equation (2), the converted motion blur CONV_BLUR in the actual shooting is calculated by multiplying the length VEC_LEN of the motion vector by the conversion gain CONV_GAIN.

Specifically, as illustrated in FIG. 8, when the length VEC_LEN of the motion vector in the preparatory shooting is 10 pixels and the exposure time EXP_TIME in the actual shooting is 1/120 seconds, the conversion gain CONV_GAIN is ½×, and thus the converted motion blur is 5 pixels. Likewise, when the exposure time EXP_TIME in the actual shooting is 1/30 seconds, the conversion gain CONV_GAIN is 2×, and thus the converted motion blur is 20 pixels.

Returning to FIG. 4, in step S405, the motion blur notification plane generation unit 303 creates an image plane for notifying the user of the motion blur (a motion blur notification plane) on the basis of the converted motion blur for each pixel, calculated in step S404.

In step S406, the image superimposing unit 304 generates the motion blur notification image by superimposing the motion blur notification plane created in step S405 onto the preparatory shooting image.

Three examples of the motion blur notification image will be described here with reference to FIG. 9A to 9E. Displaying the motion blur notification image in the display unit 109 during the preparatory shooting makes it possible for the user to easily confirm the motion blur.

Figure 9A:
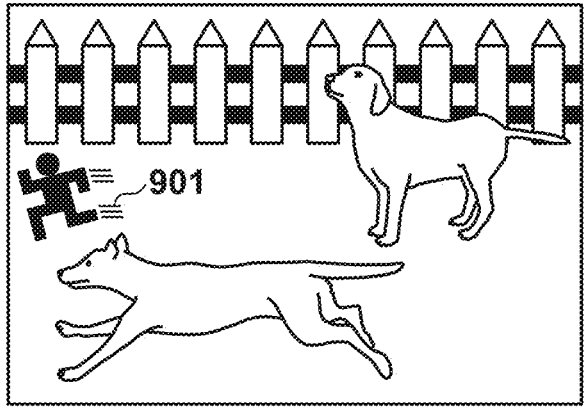
FIGS. 9A to 9E are diagrams illustrating three examples of a motion blur notification image.
Figure 9B:
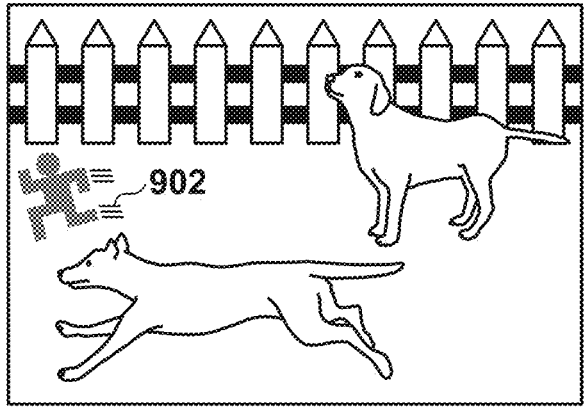
Figure 9C:
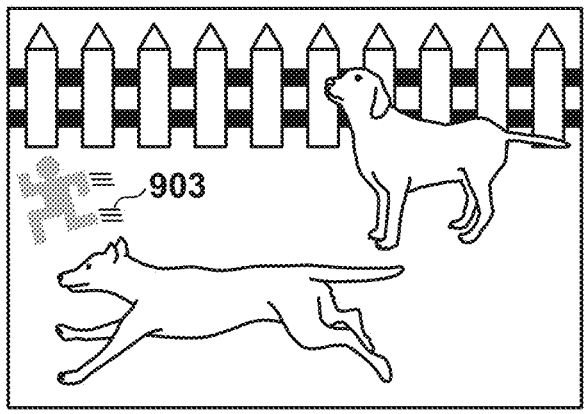

FIGS. 9A to 9C illustrate an example of notifying the user of the motion blur by displaying an icon. A method for generating the motion blur notification image by displaying an icon will be described here. In step S405, of the converted motion blur for each pixel, the motion blur notification plane generation unit 303 calculates the percentage of the number of pixels having a converted motion blur of a predetermined value or higher, with respect to the entire screen. When the percentage is greater than or equal to a predetermined percentage, the motion blur notification plane generation unit 303 determines the converted motion blur, from among the converted motion blur at greater than or equal to a predetermined value, that occupies the greatest percentage in the screen.

Figure 10:
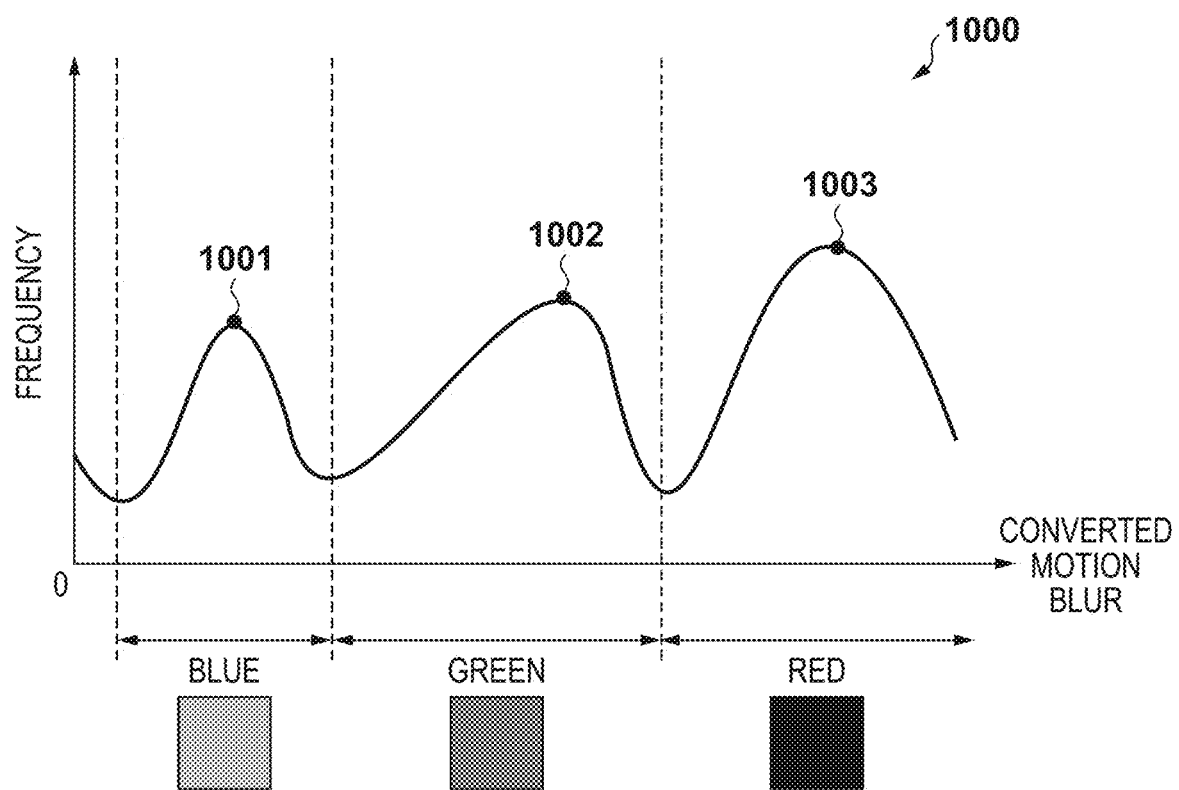
FIG. 10 is a diagram illustrating a histogram of converted motion blur having a predetermined value or higher in the scene illustrated in FIG. 5A.

The method for determining the converted motion blur that occupies the greatest percentage of the screen will be described with reference to FIG. 10. FIG. 10 is a diagram illustrating a histogram of converted motion blur having a predetermined value or higher in the scene illustrated in FIG. 5A. The motion blur notification plane generation unit 303 can generate a histogram such as that illustrated in FIG. 10, and then divide ranges of the converted motion blur on the basis of the generated histogram. The number of classes in the histogram can be set in advance. For example, consider a case where peaks (local maximum points) are present in the frequency of the histogram, as indicated in FIG. 10. In this case, the motion blur notification plane generation unit 303 can divide the range of the converted motion blur so that each divided range has one peak, with each peak serving as a representative motion blur for a corresponding part of the object. Note that the peaks in the histogram can be detected using a method similar to that used for detecting peaks in signal waveforms.

For example, three peaks 1001 to 1003 are present in the frequency of the histogram 1000 illustrated in FIG. 10. As such, the motion blur notification plane generation unit 303 divides the range of the converted motion blur at the positions where the frequency of the converted motion blur first becomes a local minimum, on the lower sides from each peak, and then assigns display colors to each of the resulting divided ranges. As illustrated in FIG. 10, when the percentage of the converted motion blur corresponding to the peak 1003 is the highest, the motion blur notification plane generation unit 303 creates a red motion blur notification icon 901, as indicated in FIG. 9A, as the motion blur notification plane. Then, in step S406, the image superimposing unit 304 generates a motion blur notification image such as that illustrated in FIG. 9A by superimposing the motion blur notification plane, including the motion blur notification icon 901, onto the preparatory shooting image.

When the peak 1002 is higher than the peak 1003 and the percentage of the converted motion blur corresponding to the peak 1002 is the highest, the motion blur notification plane generation unit 303 creates a green motion blur notification icon 902, as indicated in FIG. 9B, as the motion blur notification plane. Then, in step S406, the image superimposing unit 304 generates a motion blur notification image such as that illustrated in FIG. 9B by superimposing the motion blur notification plane, including the motion blur notification icon 902, onto the preparatory shooting image.

Likewise, when the peak 1001 is higher than the peak 1003 and the percentage of the converted motion blur corresponding to the peak 1001 is the highest, the motion blur notification plane generation unit 303 creates a blue motion blur notification icon 903, as indicated in FIG. 9C, as the motion blur notification plane. Then, in step S406, the image superimposing unit 304 generates a motion blur notification image such as that illustrated in FIG. 9C by superimposing the motion blur notification plane, including the motion blur notification icon 903, onto the preparatory shooting image.

Although the foregoing describes dividing the converted motion blur ranges using minimum points in the histogram, the converted motion blur ranges may be divided at a predetermined threshold instead. Alternatively, a configuration in which the division positions are varied in accordance with conditions may be employed as well. Even if such a division method is employed, the motion blur notification plane generation unit 303 can create, as the motion blur notification plane, a motion blur notification icon having a display color corresponding to the divided range including the converted motion blur that occupies the highest percentage in the screen.

Figure 9D:
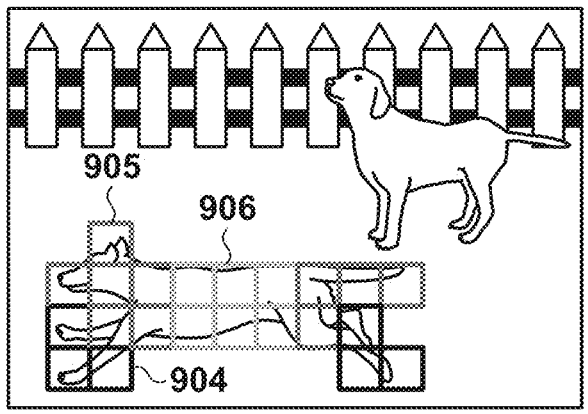

FIG. 9D illustrates an example of notifying the user of the motion blur by displaying frames. A method for generating the motion blur notification image by displaying frames will be described here. In step S405, of the pixels within divided regions of the shooting screen, the motion blur notification plane generation unit 303 calculates the percentage of the number of pixels having a converted motion blur of a predetermined value or higher, with respect to the overall divided regions. For divided regions in which that percentage is greater than or equal to a predetermined percentage, the motion blur notification plane generation unit 303 creates motion blur notification frames, as illustrated in FIG. 9D, as the motion blur notification plane. At this time, the motion blur notification plane generation unit 303 determines the display color of the motion blur notification frames corresponding to each divided region in accordance with the magnitude of the converted motion blur in each divided region.

For example, the motion blur notification plane generation unit 303 divides the converted motion blur range into three parts on the basis of three thresholds, and assigns blue, green, and red to the divided ranges in that order, starting with the lowest converted motion blur. In this case, the motion blur notification plane generation unit 303 creates red motion blur notification frames 904 for the parts corresponding to the legs, where there is a high amount of converted motion blur, and creates green motion blur notification frames 905 for parts corresponding to the head and tail, where there is a medium amount of converted motion blur. The motion blur notification plane generation unit 303 also creates blue motion blur notification frames 906 for parts corresponding to the trunk, where there is little converted motion blur. Then, in step S406, the image superimposing unit 304 generates a motion blur notification image such as that illustrated in FIG. 9D by superimposing the motion blur notification plane, including the motion blur notification frames 904 to 906, onto the preparatory shooting image.

Figure 9E:
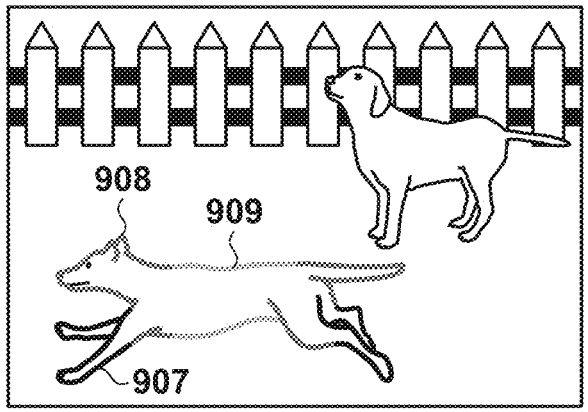

FIG. 9E illustrates an example of notifying the user of the motion blur by displaying edges in which motion blur has arisen in an enhanced manner. A method for generating the motion blur notification image by displaying the edges in which motion blur has arisen in an enhanced manner will be described here. In step S405, the motion blur notification plane generation unit 303 detects the edge strength of the preparatory shooting image. It is assumed that the edge strength is calculated using a known technique such as a Sobel filter, so this will not be described here. The motion blur notification plane generation unit 303 then extracts pixels for which the edge strength is greater than or equal to a predetermined value and for which the converted motion blur is greater than or equal to a predetermined value. The motion blur notification plane generation unit 303 then creates a motion blur notification plane, in which the edge areas where motion blur has arisen are displayed in an enhanced manner for the extracted pixels, as indicated by motion blur notification edges 907 to 909 in FIG. 9E. At this time, the motion blur notification plane generation unit 303 determines the display color of each pixel in the motion blur notification edges in accordance with the amount of converted motion blur in those pixels.

For example, the motion blur notification plane generation unit 303 divides the converted motion blur range into three parts on the basis of three thresholds, and assigns blue, green, and red to the divided ranges in that order, starting with the lowest converted motion blur. In this case, the motion blur notification plane generation unit 303 creates red motion blur notification edges 907 for the pixels in the parts corresponding to the legs, where there is a high amount of converted motion blur, and creates green motion blur notification edges 908 for the pixels in the parts corresponding to the head and tail, where there is a medium amount of converted motion blur. The motion blur notification plane generation unit 303 also creates blue motion blur notification edges 909 for the pixels in the parts corresponding to the trunk, where there is little converted motion blur. Then, in step S406, the image superimposing unit 304 generates a motion blur notification image such as that illustrated in FIG. 9E by superimposing the motion blur notification plane, including the motion blur notification edges 907 to 909, onto the preparatory shooting image.

Although FIG. 9E illustrates an example in which the edges are displayed in an enhanced manner by varying the display colors of the motion blur notification edges in accordance with the amount of converted motion blur, the enhanced display method is not limited thereto. A method of displaying the edges in an enhanced manner by varying the thicknesses of the motion blur notification edges in accordance with the amount of converted motion blur can be given as another example of an enhanced display method.

According to the first embodiment as described thus far, the image capturing apparatus 100 detects the motion amount of an object from an image obtained through preparatory shooting, and converts the motion amount to a motion blur amount arising during actual shooting. The image capturing apparatus 100 then notifies the user of the motion blur on the basis of the motion blur amount. At this time, the image capturing apparatus 100 varies the form of the notification in accordance with the amount of the motion blur. This makes it possible for the photographer to easily know, in advance, how much motion blur will arise in the actual shooting.

The present embodiment describes, with reference to FIGS. 9A to 9E, an example in which the user is notified of the motion blur when the converted motion blur is greater than or equal to a predetermined value. However, a configuration in which the user is notified of the motion blur even when the converted motion blur is less than the predetermined value may be employed. This makes it easy for the user to confirm whether the motion blur is insufficient during the preparatory shooting period, such as in long-exposure shooting, where the user wishes to use motion blur to express a sense of motion.

Additionally, although the present embodiment describes an example in which the user is notified of the motion blur when the converted motion blur is greater than or equal to a predetermined value, a configuration may be employed in which the user is notified having set a range for the converted motion blur in which a notification is to be made. As an example of a way for setting the range in which a notification is to be made, if the user has decided to view the shot image in the display, a range is set in which motion blur can be confirmed visually when the image is displayed in the designated display at actual size. A method in which the range at which motion blur can be recognized in the display is converted to a range corresponding to the size of the shot image on the basis of the difference between the number of pixels of the shot image and the number of pixels of the display can be used as a method for calculating the range. The image capturing apparatus 100 then notifies the user of the converted motion blur when the blur is within the converted range.

Additionally, although the present embodiment describes an example in which the user is notified of the motion blur when the converted motion blur is greater than or equal to a predetermined value, a configuration may be employed in which the predetermined value is determined on the basis of information from an angular velocity sensor. When the user takes a shot while holding the image capturing apparatus 100 in his or her hand, blur resulting from his or her hand shaking, camerawork, and the like is included as converted motion blur in the calculated range. If a notification is to be made only for the converted motion blur of the object, while excluding blur caused by hand shake and camerawork, removing converted motion blur within the same range as the movements detected by the angular velocity sensor makes it possible to notify the user only of motion blur arising in the object.

Additionally, although the present embodiment describes the motion blur notification icons 901 to 903, the motion blur notification frames 904 to 906, and the motion blur notification edges 907 to 909 as three examples of the motion blur notification plane, the types of the motion blur notification planes are not limited thereto. For example, a configuration may be employed in which all regions where motion blur is arising, including both the edge region and a flat region, are displayed in an enhanced manner. Specifically, the motion blur notification plane generation unit 303 carries out an enhanced display in which the pixels where the per-pixel converted motion blur is greater than or equal to a predetermined value are colored with a color based on the amount of converted motion blur. Carrying out the enhanced display for both the edge region and regions aside from the edge region in this manner ensure the entire object is displayed in an enhanced manner, which makes it easier to confirm motion blur.

Additionally, although the present embodiment describes a configuration in which the motion blur notification image is displayed in the display unit 109 as the method for notifying the user of motion blur, the method for notifying the user of motion blur is not limited thereto. For example, a configuration in which the user is notified of motion blur by outputting sound may be employed. In this case, for example, the control unit 101 may output a motion blur notification sound from a speaker (not shown) when, of the converted motion blur for each pixel, the percentage of the number of pixels having a converted motion blur of a predetermined value or higher, with respect to the entire screen, is greater than or equal to a predetermined percentage. Then, the control unit 101 may divide the range of the converted motion blur using the same method as that described with reference to FIG. 10, assign a different volume to each divided range, and then output motion blur notification sound at a volume corresponding to the divided range including the converted motion blur that occupies the highest percentage within the screen. Alternatively, the control unit 101 may assign a different type of sound to each divided range, and output the type of motion blur notification sound corresponding to the divided range including the converted motion blur that occupies the highest percentage in the screen. In other words, the control unit 101 can change at least one of the type of the sound and the volume in accordance with the amount of converted motion blur.

Additionally, although the present embodiment describes, as a method of making the motion blur notification, an example in which the display color of the motion blur notification icon is changed in accordance with the amount of converted motion blur, the item to be varied in accordance with the amount of converted motion blur is not limited to the display color. For example, a configuration may be employed in which the size of the motion blur notification icon is varied in accordance with the amount of converted motion blur. For example, a configuration may be employed in which the icon size is increased when there is more converted motion blur, and the icon size is reduced when there is less converted motion blur. Varying the icon size in accordance with the amount of converted motion blur in this manner makes it possible for the user to easily confirm the intensity of the motion blur.

Accordingly, the notification image generating unit 300 can carry out control for displaying blur notification icons, which have different appearances depending on the amount of converted motion blur, along with the preparatory shooting image. For example, the notification image generating unit 300 can vary at least one of the color and size of the blur notification icon in accordance with the amount of converted motion blur.

Additionally, although the present embodiment describes, as a method of making the motion blur notification, an example in which the display color of the motion blur notification frames or the motion blur notification edges is changed in accordance with the amount of converted motion blur, the item to be varied in accordance with the amount of converted motion blur is not limited to the display color. For example, a configuration may be employed in which the thickness of the lines of the motion blur notification frames or the motion blur notification edges is varied in accordance with the amount of converted motion blur. For example, a configuration may be employed in which the frames or edges are displayed thicker when there is more converted motion blur, and thinner when there is less converted motion blur. Varying the line thickness in accordance with the amount of converted motion blur in this manner makes it possible for the user to easily confirm the intensity of the motion blur.

Accordingly, the notification image generating unit 300 can carry out control for displaying a plurality of blur notification frames, which surround a plurality of divided regions in the preparatory shooting image where motion blur is arising, along with the preparatory shooting image. The notification image generating unit 300 can then vary the appearance of each blur notification frame in accordance with the amount of converted motion blur in the divided region corresponding to the blur notification frame. For example, the notification image generating unit 300 can vary at least one of the color and size of each blur notification frame in accordance with the amount of converted motion blur in the divided region corresponding to the blur notification frame. Note that the region where the blur notification frame is displayed is not limited to the divided region, and a motion blur notification can be made using a blur notification frame for any desired partial region in the preparatory shooting image where motion blur is arising. Additionally, the notification image generating unit 300 can display a plurality of edge regions where motion blur is arising in the preparatory shooting image, in an enhanced manner with different forms depending on the amount of converted motion blur in each of the edge regions. The "enhanced display" includes at least one of displaying the plurality of edge regions with different colors depending on the amount of converted motion blur in each of the edge regions, and displaying the plurality of edge regions using lines of different thicknesses depending on the amount of converted motion blur in each of the edge regions.

The present embodiment describes a configuration in which the motion amount of an object is detected from an image obtained through preparatory shooting, and by converting that motion amount to a motion blur amount that will arise in the actual shooting, the motion blur amount that will arise in the actual shooting is estimated. However, the method for estimating the motion blur amount that will arise in the actual shooting is not limited thereto. Additionally, the two instances of shooting, i.e., the preparatory shooting and the actual shooting, may be any two types of shooting (first shooting and second shooting). For example, the image capturing apparatus 100 may obtain a first shot image obtained through the first shooting under first shooting conditions, and motion information of an object in the first shot image. The motion information obtained here is the speed of the object in the first shot image (e.g., a movement amount in a unit of time, expressed as a number of pixels). Then, on the basis of the motion information and second shooting conditions, the image capturing apparatus 100 may estimate the motion blur amount of the object in a second shot image obtained when the second shooting is carried out under the second shooting conditions. The second shooting conditions are set independent from the first shooting conditions. This point also applies to the second to fifth embodiments, which will be described hereinafter.

Second Embodiment

Although the first embodiment described a configuration in which a motion amount detected from a preparatory shooting image is converted into a motion blur amount arising in actual shooting, the second embodiment will describe a configuration in which a motion amount of an image capturing apparatus that is carrying out preparatory shooting is converted into a motion blur amount arising in actual shooting. Although the second embodiment will be described with reference to an image capturing apparatus 1100, illustrated in FIG. 11, instead of the image capturing apparatus 100 illustrated in FIG. 1, the configuration and operations of the image capturing apparatus 1100 share some common parts with the image capturing apparatus 100. The following will primarily describe points that are different from the first embodiment.

Figure 11:
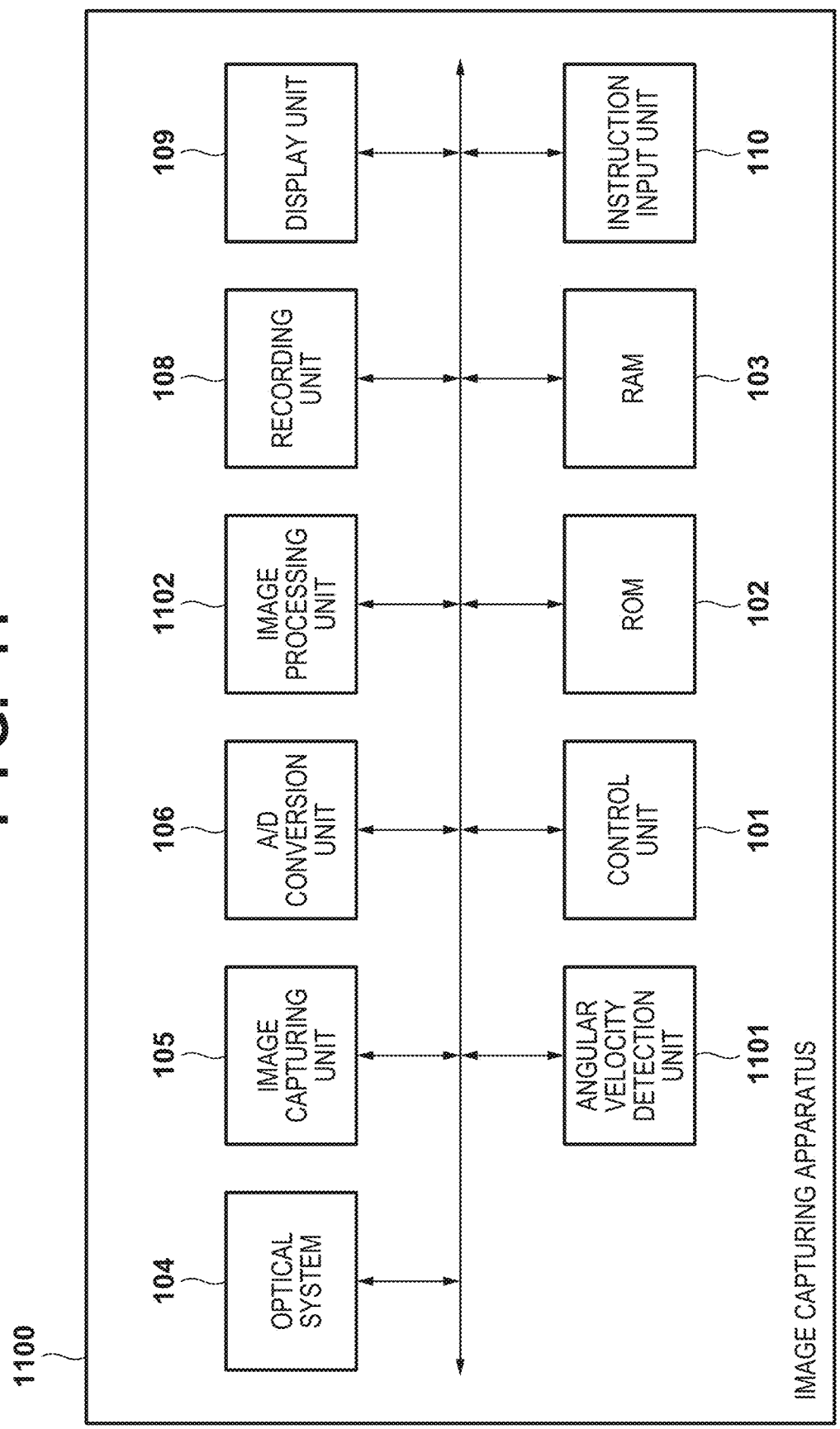
FIG. 11 is a block diagram illustrating the configuration of an image capturing apparatus 1100 including a notifying apparatus.

The image capturing apparatus 1100 illustrated in FIG. 11 differs from the image capturing apparatus 100 illustrated in FIG. 1 in that an angular velocity detection unit 1101 has been added, and the image processing unit 107 has been replaced with an image processing unit 1102.

The angular velocity detection unit 1101 is an angular velocity sensor, for example, which detects the angular velocity of the image capturing apparatus 1100 itself, caused by the user's hand shaking, the user's camerawork, or the like, in a yaw direction and a pitch direction. Any desired known method can be used as the method by which the angular velocity detection unit 1101 detects the angular velocity.

The image processing unit 1102 includes a notification image generating unit 1200 (described later), which generates a motion blur notification image by superimposing an image plane enabling motion blur to be easily confirmed over an image stored in the RAM 103.

Figure 12:
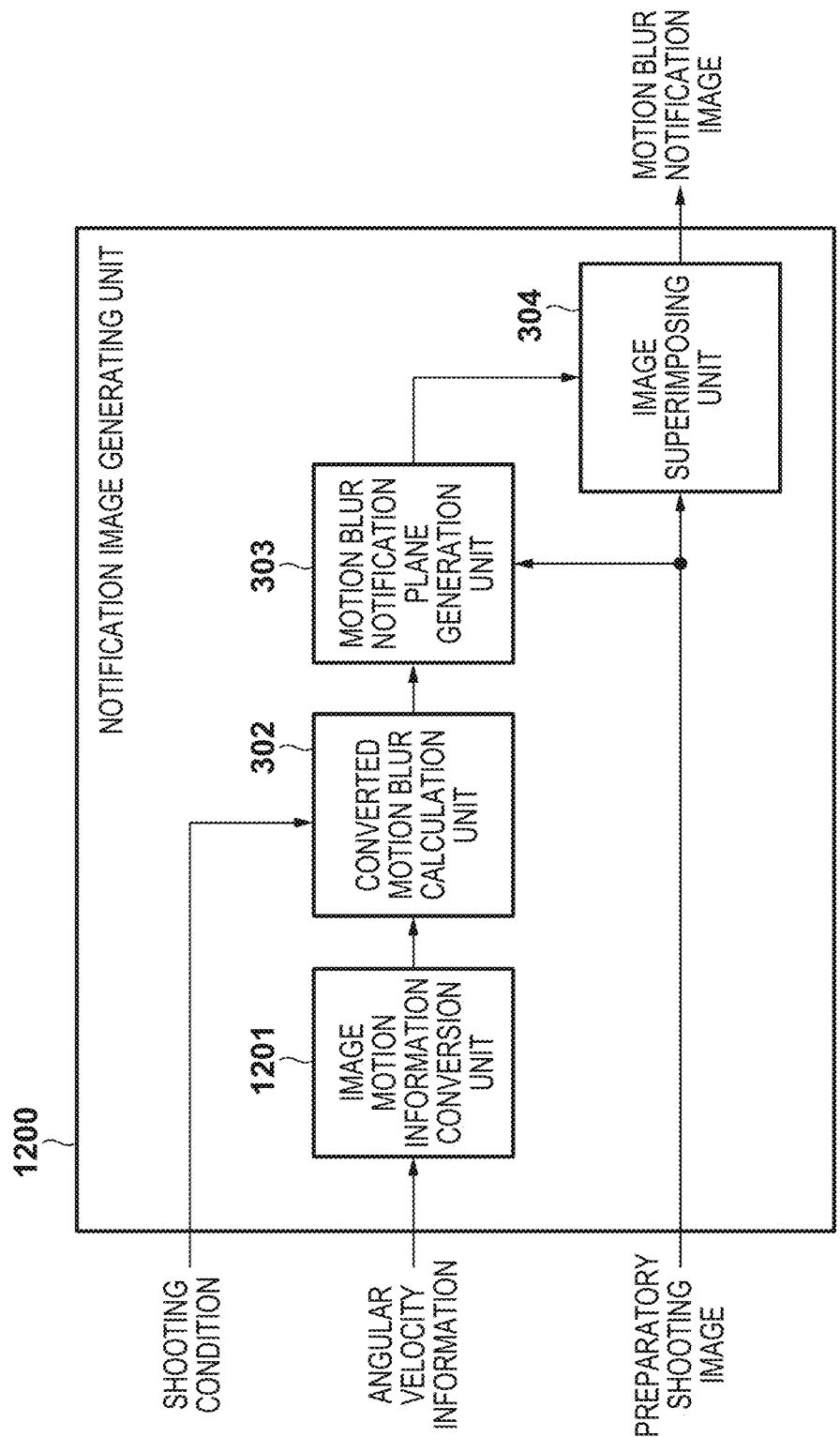
FIG. 12 is a diagram illustrating an example of the configuration of a notification image generating unit 1200 included in an image processing unit 1102.

An example of the configuration of the notification image generating unit 1200 included in the image processing unit 1102 will be described next with reference to FIG. 12. The notification image generating unit 1200 illustrated in FIG. 12 differs from the notification image generating unit 300 illustrated in FIG. 3 in that the motion vector calculation unit 301 has been replaced with an image motion information conversion unit 1201. The operations of the notification image generating unit 1200 will be described in detail later with reference to FIG. 13.

Figure 13:
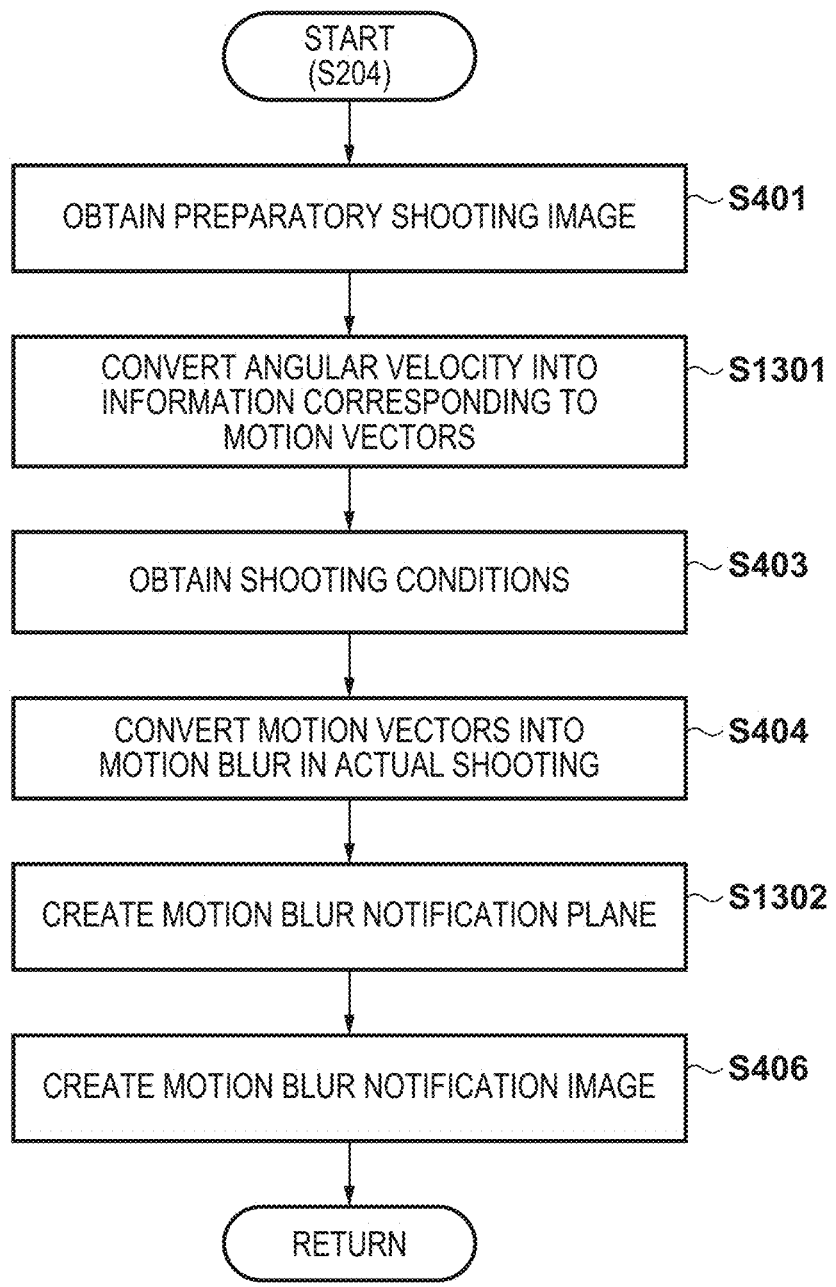
FIG. 13 is a flowchart illustrating a process by which the notification image generating unit 1200 generates a motion blur notification image (step S204 in FIG. 2).

Next, the process by which the notification image generating unit 1200 generates the motion blur notification image (step S204 in FIG. 2) will be described in detail with reference to FIG. 13.

In step S1301, the image motion information conversion unit 1201 converts the angular velocity detected by the angular velocity detection unit 1101 into information corresponding to motion vectors in the image. Equations (3) and (4) indicate approximate transformations for converting the angular velocity into information corresponding to motion vectors in the image.

$$\mathrm{MOV\_yaw} \approx \frac{f\tan\left(-\frac{\omega\_\mathrm{yaw}}{\mathit{fps}}\right)}{pp} \quad (3)$$

$$\mathrm{MOV\_pitch} \approx \frac{f\tan\left(-\frac{\omega\_\mathrm{pitch}}{\mathit{fps}}\right)}{pp} \quad (4)$$

Here, MOV_yaw represents the amount of movement in the yaw direction, and MOV_pitch represents the amount of movement in the pitch direction. f represents the focal length, ω_yaw represents the angular velocity in the yaw direction, ω_pitch represents the angular velocity in the pitch direction, fps represents the framerate of the preparatory shooting, and pp represents the pixel pitch of the image capturing unit 105.

According to the approximate transformation equations indicated in Equations (3) and (4), the amount of movement in the image capturing plane is calculated on the basis of the angle of movement in the time interval between images in the preparatory shooting, and the focal length; the amount of movement in the image (the number of pixels of movement) is then calculated by dividing the amount of movement in the image capturing plane by the pixel pitch. Here, the calculated amount of movement in the image does not differ from pixel to pixel, but is instead uniform for all of the pixels.

The image motion information conversion unit 1201 treats the amount of movement in the yaw direction as an amount of movement in the horizontal direction and the amount of movement in the pitch direction as an amount of movement in the vertical direction, and then outputs the combination of these movement amounts to the converted motion blur calculation unit 302 as motion vectors uniform for all the pixels.

In step S1302, the motion blur notification plane generation unit 303 creates an image plane for notifying the user of the motion blur (the motion blur notification plane) on the basis of the converted motion blur calculated in step S404. The process of step S1302 is the same as in the first embodiment (step S405 in FIG. 4) in that the motion blur notification plane is created with different forms depending on the amount of the converted motion blur. However, in the second embodiment, the motion vectors are uniform for all of the pixels, and thus the converted motion blur is also uniform for all of the pixels, which means that a histogram such as that illustrated in FIG. 10 cannot be generated. Accordingly, the motion blur notification plane generation unit 303 determines the form of the motion blur notification plane by, for example, comparing the amount of converted motion blur that is uniform for all of the pixels to one or more thresholds. For example, assume that A represents the amount of the converted motion blur, and T1, T2, and T3 represent three thresholds (T1<T2<T3). If T1≤A<T2, the motion blur notification plane generation unit 303 creates the blue motion blur notification icon 903 (FIG. 9C) as the motion blur notification plane. If T2≤A<T3, the motion blur notification plane generation unit 303 creates the green motion blur notification icon 902 (FIG. 9B) as the motion blur notification plane. If T3≤A, the motion blur notification plane generation unit 303 creates the red motion blur notification icon 901 (FIG. 9A) as the motion blur notification plane.

According to the second embodiment as described thus far, the image capturing apparatus 1100 converts the motion amount of the image capturing apparatus 1100 carrying out preparatory shooting into the motion blur amount that will arise in the actual shooting. This makes it possible to obtain the converted motion blur with a comparatively light processing load.

The second embodiment describes an example in which the amount of movement in the image capturing plane is calculated on the basis of the angle of movement in the time interval between images in the preparatory shooting, and the focal length, and the amount of movement in the image is then calculated by dividing the amount of movement in the image capturing plane by the pixel pitch. However, the method for calculating the amount of movement in the image is not limited thereto. A configuration may be employed in which the amount of movement in the image capturing plane is calculated on the basis of the angle of movement in an exposure period of the image in the preparatory shooting, and the focal length, and the amount of movement in the image is then calculated by dividing the amount of movement in the image capturing plane by the pixel pitch. Specifically, the angular velocity detection unit 1101 detects the angular velocity during the exposure period of the image during the preparatory shooting, and the notification image generating unit 1200 generates the motion blur notification image on the basis of that angular velocity. Note that in this case, the converted motion blur calculation unit 302 converts motion vectors uniform for all the pixels into motion blur arising in the actual shooting, on the basis of the exposure time for the actual shooting and the exposure time for the image during the preparatory shooting. In this manner, the image capturing apparatus 1100 can calculate the motion blur arising during actual shooting from the motion amount of the image capturing apparatus 1100 (e.g., the angle of movement) in a predetermined period (e.g., the time interval between images in the preparatory shooting or the exposure period of the image in the preparatory shooting).

Third Embodiment

The third embodiment will describe a configuration in which the motion blur notification plane is created with different forms depending on divergence between the converted motion blur and a target motion blur. In the third embodiment, the basic configuration of the image capturing apparatus 100 is the same as in the first embodiment (see FIG. 1). The following will primarily describe points that are different from the first embodiment.

Figure 3:
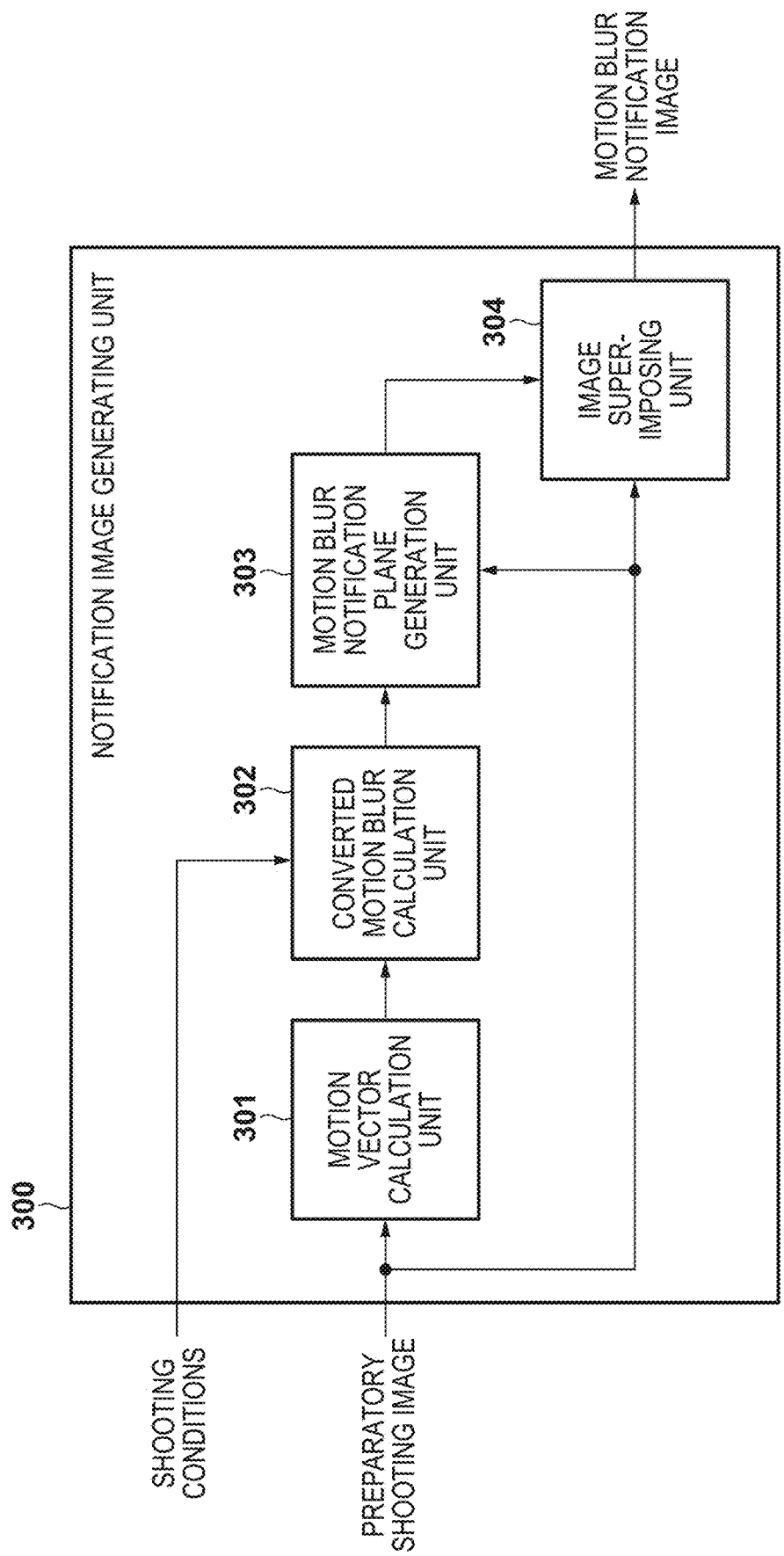
FIG. 3 is a diagram illustrating an example of the configuration of a notification image generating unit 300 included in an image processing unit 107 according to the first embodiment.
Figure 14:
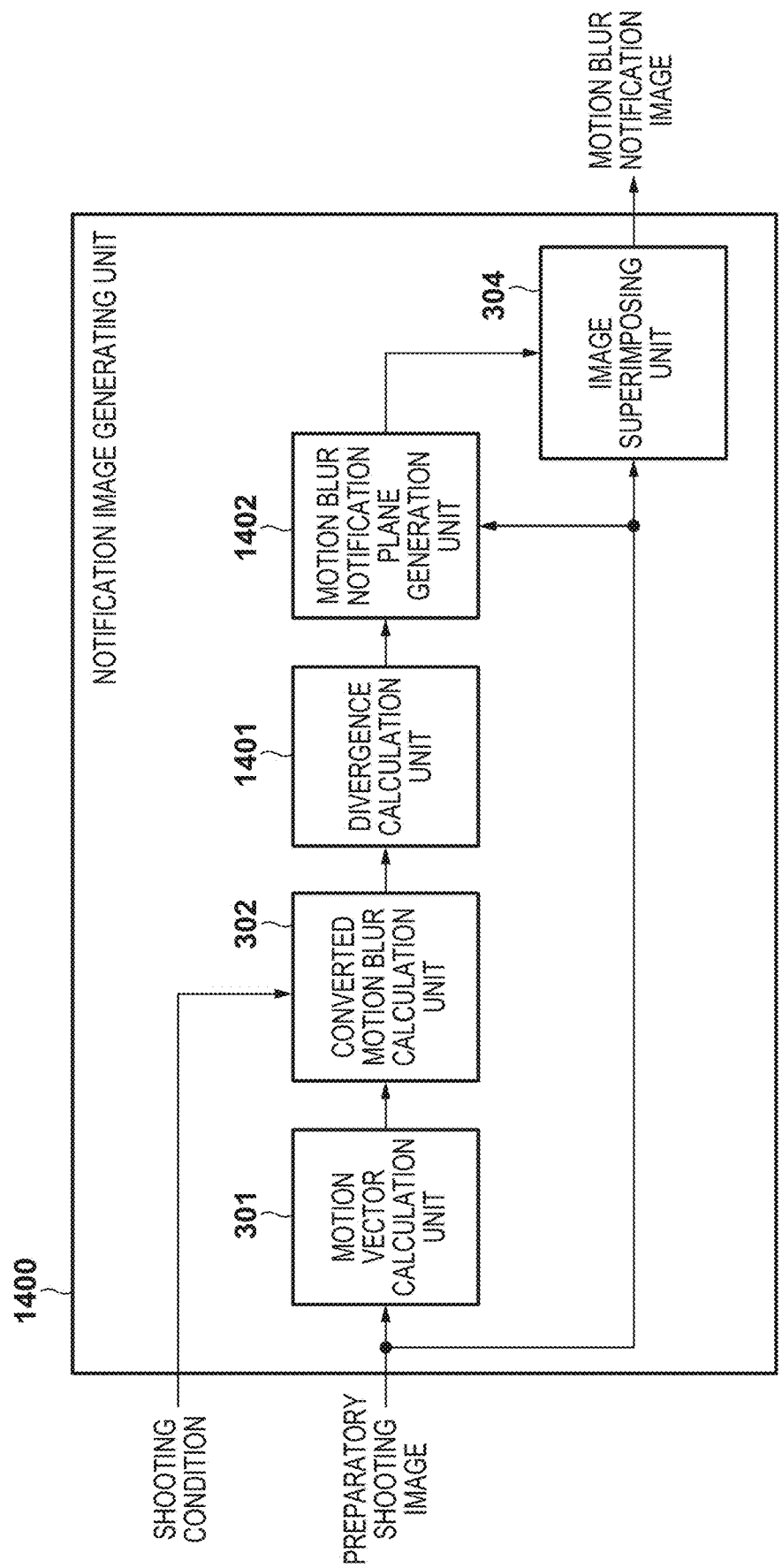
FIG. 14 is a diagram illustrating an example of the configuration of a notification image generating unit 1400 included in the image processing unit 107 according to a third embodiment.

In the present embodiment, the image processing unit 107 of the image capturing apparatus 100 includes a notification image generating unit 1400 (FIG. 14) instead of the notification image generating unit 300 (FIG. 3). The notification image generating unit 1400 illustrated in FIG. 14 differs from the notification image generating unit 300 illustrated in FIG. 3 in that a divergence calculation unit 1401 has been added, and the motion blur notification plane generation unit 303 has been replaced with a motion blur notification plane generation unit 1402. The operations of the notification image generating unit 1400 will be described in detail later with reference to FIG. 15.

Next, the process by which the notification image generating unit 1400 generates the motion blur notification image (step S204 in FIG. 2) will be described in detail with reference to FIG. 15.

In step S1501, the divergence calculation unit 1401 calculates a target value for the converted motion blur in the actual shooting (the target motion blur), and finds the divergence between the target motion blur and the converted motion blur for each pixel calculated in step S404. The divergence calculation unit 1401 calculates a converted motion blur that is permissible within the screen as the target motion blur. For example, if the user has decided to view shot images in a display, the "converted motion blur that is permissible within the screen" corresponds to the upper limit of a range at which the motion blur cannot be seen visually when the image is displayed in the designated display at actual size.

The method for calculating the divergence between the converted motion blur and the target motion blur will be described with reference to FIGS. 16A to 16C. FIGS. 16A to 16C are diagrams illustrating converted motion blur corresponding to the current shutter speed (exposure time) in actual shooting, and converted motion blur when the shutter speed (exposure time) has been changed. FIGS. 16A to 16C illustrate examples in which the exposure time in the actual shooting is $\frac{1}{125}$ seconds, and the exposure time after the change is $\frac{1}{250}$ seconds, $\frac{1}{500}$ seconds, and $\frac{1}{1000}$ seconds, as the shooting conditions.

The divergence calculation unit 1401 calculates the divergence between the converted motion blur and the target motion blur for each pixel on the basis of the following Equations (5) to (7).

$$\text{DIFF} = \text{TARG\_BLUR}/\text{CONV\_BLUR} \quad (5)$$

$$\text{TARG\_TIME} = \text{EXP\_TIME} \times \text{DIFF} \quad (6)$$

$$\text{STEP} = \text{LOG}_2(\text{DIFF}) \quad (7)$$

In Equation (5), TARG_BLUR represents the target motion blur, and DIFF represents the difference between the target motion blur and the converted motion blur (the ratio of the target motion blur to the converted motion blur, here). In Equation (6), TARG_TIME represents a target exposure time, and EXP_TIME represents the current exposure time. In Equation (7), STEP represents the number of shutter speed steps required to change from the current exposure time to the target exposure time.

In Equation (5), the difference between the target motion blur and the converted motion blur is calculated by dividing the target motion blur by a converted motion vector. Next, in Equation (6), the target exposure time is calculated by multiplying the current exposure time by the divergence. The number of shutter speed steps to change from the current exposure time in order to achieve the target exposure time calculated through Equation (6) is calculated using Equation (7).

FIG. 16A illustrates a case where the current converted motion blur is 40 pixels. Assuming the target motion blur is 5 pixels, DIFF is ⅛×; thus for the current exposure time of $\frac{1}{125}$ seconds, the target exposure time is $\frac{1}{1000}$ seconds, meaning that the number of steps the shutter speed is changed is −3 steps.

FIG. 16B illustrates a case where the current converted motion blur is 20 pixels. Assuming the target motion blur is 5 pixels, DIFF is ¼×; thus for the current exposure time of $\frac{1}{125}$ seconds, the target exposure time is $\frac{1}{500}$ seconds, meaning that the number of steps the shutter speed is changed is −2 steps.

FIG. 16C illustrates a case where the current converted motion blur is 10 pixels. Assuming the target motion blur is 5 pixels, DIFF is ½×; thus for the current exposure time of $\frac{1}{125}$ seconds, the target exposure time is $\frac{1}{250}$ seconds, meaning that the number of steps the shutter speed is changed is −1 steps.

Returning to FIG. 15, in step S1502, the motion blur notification plane generation unit 1402 creates an image plane for notifying the user of the motion blur (a motion blur notification plane) on the basis of the divergence between the converted motion blur and the target motion blur for each pixel (the divergence for each pixel) calculated in step S1501.

Three examples of the motion blur notification image will be described here with reference to FIGS. 9A to 9E. Displaying the motion blur notification image in the display unit 109 during the preparatory shooting makes it possible for the user to easily confirm the motion blur.

FIGS. 9A to 9C illustrate an example of notifying the user of the motion blur by displaying an icon. A method for generating the motion blur notification image by displaying an icon will be described here. In step S1502, of the converted motion blur for each pixel, the motion blur notification plane generation unit 1402 calculates the percentage of the number of pixels having a converted motion blur of a predetermined value or higher, with respect to the entire screen. When the percentage is greater than or equal to a predetermined percentage, the motion blur notification plane generation unit 1402 determines the converted motion blur, from among the converted motion blur at greater than or equal to a predetermined value, that occupies the greatest percentage in the screen.

The method for determining the converted motion blur that occupies the greatest percentage of the screen will be described with reference to FIG. 10. FIG. 10 is a diagram illustrating a histogram of converted motion blur having a predetermined value or higher in the scene illustrated in FIG. 5A. The motion blur notification plane generation unit 1402 can generate a histogram such as that illustrated in FIG. 10, and then divide ranges of the converted motion blur on the basis of the generated histogram. The number of classes in the histogram can be set in advance. For example, consider a case where peaks (local maximum points) are present in the frequency of the histogram, as indicated in FIG. 10. In this case, the motion blur notification plane generation unit 1402 can divide the range of the converted motion blur so that each divided range has one peak, with each peak serving as a representative motion blur for a corresponding part of the object. Note that the peaks in the histogram can be detected using a method similar to that used for detecting peaks in signal waveforms.

For example, three peaks 1001 to 1003 are present in the frequency of the histogram 1000 illustrated in FIG. 10. As such, the motion blur notification plane generation unit 1402 divides the range of the converted motion blur at the positions where the frequency of the converted motion blur first becomes a local minimum, from each peak. The motion blur notification plane generation unit 1402 then assigns a display color to each divided range on the basis of the divergences corresponding to the peaks 1001 to 1003. For example, the motion blur notification plane generation unit 1402 assigns red to the divided range including the peak 1003, where three steps' (or more) worth of a shutter speed change is required, as illustrated in FIG. 16A. Likewise, the motion blur notification plane generation unit 1402 assigns green to the divided range including the peak 1002, where two steps' worth of a shutter speed change is required, as illustrated in FIG. 16B. Finally, the motion blur notification plane generation unit 1402 assigns blue to the divided range including the peak 1001, where one step's worth of a shutter speed change is required, as illustrated in FIG. 16C.

When the display colors have been assigned in this manner, and the percentage of the converted motion blur corresponding to the peak 1003 is the highest as illustrated in FIG. 10, the motion blur notification plane generation unit 1402 creates the red motion blur notification icon 901, as indicated in FIG. 9A, as the motion blur notification plane. Then, in step S406, the image superimposing unit 304 generates a motion blur notification image such as that illustrated in FIG. 9A by superimposing the motion blur notification plane, including the motion blur notification icon 901, onto the preparatory shooting image.

When the peak 1002 is higher than the peak 1003 and the percentage of the converted motion blur corresponding to the peak 1002 is the highest, the motion blur notification plane generation unit 1402 creates a green motion blur notification icon 902, as indicated in FIG. 9B, as the motion blur notification plane. Then, in step S406, the image superimposing unit 304 generates a motion blur notification image such as that illustrated in FIG. 9B by superimposing the motion blur notification plane, including the motion blur notification icon 902, onto the preparatory shooting image.

Likewise, when the peak 1001 is higher than the peak 1003 and the percentage of the converted motion blur corresponding to the peak 1001 is the highest, the motion blur notification plane generation unit 1402 creates a blue motion blur notification icon 903, as indicated in FIG. 9C, as the motion blur notification plane. Then, in step S406, the image superimposing unit 304 generates a motion blur notification image such as that illustrated in FIG. 9C by superimposing the motion blur notification plane, including the motion blur notification icon 903, onto the preparatory shooting image.

Although the foregoing describes dividing the converted motion blur ranges using local minimum points in the histogram, the converted motion blur ranges may be divided at a predetermined threshold instead. Alternatively, a configuration in which the division points are varied in accordance with conditions may be employed as well. Even if such a division method is employed, the motion blur notification plane generation unit 1402 can create, as the motion blur notification plane, a motion blur notification icon having a display color corresponding to the divided range including the converted motion blur that occupies the highest percentage in the screen.

FIG. 9D illustrates an example of notifying the user of the motion blur by displaying frames. A method for generating the motion blur notification image by displaying frames will be described here. In step S1502, of the pixels within divided regions of the shooting screen, the motion blur notification plane generation unit 1402 calculates the percentage of the number of pixels having a converted motion blur of a predetermined value or higher, with respect to the overall divided regions. For divided regions in which that percentage is greater than or equal to a predetermined percentage, the motion blur notification plane generation unit 1402 creates motion blur notification frames, as illustrated in FIG. 9D, as the motion blur notification plane. At this time, the motion blur notification plane generation unit 1402 determines the display color of the motion blur notification frames corresponding to each divided region in accordance with the divergence in each divided region.

For example, the motion blur notification plane generation unit 1402 assigns red to divided regions having a divergence that corresponds to a change of three steps (or more) in the shutter speed. Likewise, the motion blur notification plane generation unit 1402 assigns green to divided regions having a divergence that corresponds to a change of two steps in the shutter speed. Finally, the motion blur notification plane generation unit 1402 assigns blue to divided regions having a divergence that corresponds to a change of one step in the shutter speed. In this case, the motion blur notification plane generation unit 1402 creates the red motion blur notification frames 904 for the parts corresponding to the legs, where there is a high amount of converted motion blur and thus a higher divergence, and creates the green motion blur notification frames 905 for parts corresponding to the head and tail, where there is a medium amount of converted motion blur and thus a medium divergence. The motion blur notification plane generation unit 1402 also creates blue motion blur notification frames 906 for parts corresponding to the trunk, where there is little converted motion blur and thus little divergence. Then, in step S406, the image superimposing unit 304 generates a motion blur notification image such as that illustrated in FIG. 9D by superimposing the motion blur notification plane, including the motion blur notification frames 904 to 906, onto the preparatory shooting image.

FIG. 9E illustrates an example of notifying the user of the motion blur by displaying edges in which motion blur has arisen in an enhanced manner. A method for generating the motion blur notification image by displaying the edges in which motion blur has arisen in an enhanced manner will be described here. In step S1502, the motion blur notification plane generation unit 1402 detects the edge strength of the preparatory shooting image. It is assumed that the edge strength is calculated using a known technique such as a Sobel filter, so this will not be described here. The motion blur notification plane generation unit 1402 then extracts pixels for which the edge strength is greater than or equal to a predetermined value and for which the converted motion blur is greater than or equal to a predetermined value. The motion blur notification plane generation unit 1402 then creates a motion blur notification plane, in which the edge areas where motion blur has arisen are displayed in an enhanced manner for the extracted pixels, as indicated by motion blur notification edges 907 to 909 in FIG. 9C. At this time, the motion blur notification plane generation unit 1402 determines the display color of each pixel in the motion blur notification edges in accordance with the divergence in those pixels.

For example, the motion blur notification plane generation unit 1402 assigns red to pixels having a divergence that corresponds to a change of three steps (or more) in the shutter speed. Likewise, the motion blur notification plane generation unit 1402 assigns green to pixels having a divergence that corresponds to a change of two steps in the shutter speed. Finally, the motion blur notification plane generation unit 1402 assigns blue to pixels having a divergence that corresponds to a change of one step in the shutter speed. In this case, the motion blur notification plane generation unit 1402 creates the red motion blur notification edges 907 for pixels in the parts corresponding to the legs, where there is a high amount of converted motion blur and thus a higher divergence, and creates the green motion blur notification edges 908 for pixels in the parts corresponding to the head and tail, where there is a medium amount of converted motion blur and thus a medium divergence. The motion blur notification plane generation unit 1402 also creates blue motion blur notification edges 909 for the pixels in the parts corresponding to the trunk, where there is little converted motion blur and thus little divergence. Then, in step S406, the image superimposing unit 304 generates a motion blur notification image such as that illustrated in FIG. 9E by superimposing the motion blur notification plane, including the motion blur notification edges 907 to 909, onto the preparatory shooting image.

Although FIG. 9E illustrates an example in which the edges are displayed in an enhanced manner by varying the display colors of the motion blur notification edges in accordance with the divergence, the enhanced display method is not limited thereto. A method of displaying the edges in an enhanced manner by varying the thicknesses of the motion blur notification edges in accordance with the divergence can be given as another example of an enhanced display method.

According to the third embodiment as described thus far, the image capturing apparatus 100 varies the form of the motion blur notification in accordance with the divergence between the motion blur amount that will arise in the actual shooting, and the target motion blur amount. This makes it possible for the photographer to easily know, in advance, how much motion blur will arise in the actual shooting.

Although the present embodiment describes a configuration in which the motion blur notification image is displayed in the display unit 109 as the method for notifying the user of motion blur, the method for notifying the user of motion blur is not limited thereto. For example, a configuration in which the user is notified of motion blur by outputting sound may be employed. In this case, for example, the control unit 101 may output a motion blur notification sound from a speaker (not shown) when, of the converted motion blur for each pixel, the percentage of the number of pixels having a converted motion blur of a predetermined value or higher, with respect to the entire screen, is greater than or equal to a predetermined percentage. In this case, the control unit 101 may divide the range of the converted motion blur using the same method as that described with reference to FIG. 10, and assign a different volume to each divided range depending on the divergence. The control unit 101 may then output the motion blur notification sound at a volume corresponding to the divided range including the converted motion blur that occupies the highest percentage in the screen. Alternatively, the control unit 101 may assign a different type of sound to each divided range depending on the divergence, and output the type of motion blur notification sound corresponding to the divided range including the converted motion blur that occupies the highest percentage in the screen. In other words, the control unit 101 can change at least one of the type of the sound and the volume in accordance with the divergence.

Additionally, although the present embodiment describes, as a method of making the motion blur notification, an example in which the display color of the motion blur notification icon is changed in accordance with the divergence, the item to be varied in accordance with the divergence is not limited to the display color. For example, a configuration may be employed in which the size of the motion blur notification icon is varied in accordance with the divergence. For example, a configuration may be employed in which the icon size is increased when the divergence is higher, and the icon size is reduced when the divergence is lower. Varying the icon size in accordance with the divergence in this manner makes it possible for the user to easily confirm the intensity of the motion blur.

Accordingly, the notification image generating unit 1400 can carry out control for displaying blur notification icons, which have different appearances depending on the divergence, along with the preparatory shooting image. For example, the notification image generating unit 1400 can vary at least one of the color and size of the blur notification icon in accordance with the divergence.

Additionally, although the present embodiment describes, as a method of making the motion blur notification, an example in which the display color of the motion blur notification frames or the motion blur notification edges is changed in accordance with the divergence, the item to be varied in accordance with the divergence is not limited to the display color. For example, a configuration may be employed in which the thickness of the lines of the motion blur notification frames or the motion blur notification edges is varied in accordance with the divergence. For example, a configuration may be employed in which the frames or edges are displayed thicker when there is a higher divergence, and thinner when there is a lower divergence. Varying the line thicknesses in accordance with the divergence in this manner makes it possible for the user to easily confirm the intensity of the motion blur.

Accordingly, the notification image generating unit 1400 can carry out control for displaying a plurality of blur notification frames, which surround a plurality of divided regions in the preparatory shooting image where motion blur is arising, along with the preparatory shooting image. The notification image generating unit 1400 can then vary the appearance of each blur notification frame in accordance with the divergence in the divided region corresponding to the blur notification frame. For example, the notification image generating unit 1400 can vary at least one of the color and thickness of each blur notification frame in accordance with the divergence in the divided region corresponding to the blur notification frame. Note that the region where the blur notification frame is displayed is not limited to the divided region, and a motion blur notification can be made using a blur notification frame for any desired partial region in the preparatory shooting image where motion blur is arising. Additionally, the notification image generating unit 1400 can display a plurality of edge regions where motion blur is arising in the preparatory shooting image, in an enhanced manner with different forms depending on the divergence in each of the edge regions. The "enhanced display" includes at least one of displaying the plurality of edge regions with different colors depending on the divergence in each of the edge regions, and displaying the plurality of edge regions using lines of different thicknesses depending on the divergence in each of the edge regions.

Fourth Embodiment

Although the third embodiment described a configuration in which a motion amount detected from a preparatory shooting image is converted into a motion blur amount arising in actual shooting, the fourth embodiment will describe a configuration in which a motion amount of an image capturing apparatus that is carrying out preparatory shooting is converted into a motion blur amount arising in actual shooting. Although the fourth embodiment will be described with reference to an image capturing apparatus 1700, illustrated in FIG. 17, instead of the image capturing apparatus 100 illustrated in FIG. 1, the configuration and operations of the image capturing apparatus 1700 share some common parts with the image capturing apparatus 100 according to the third embodiment. The following will primarily describe points that are different from the third embodiment.

Figure 17:
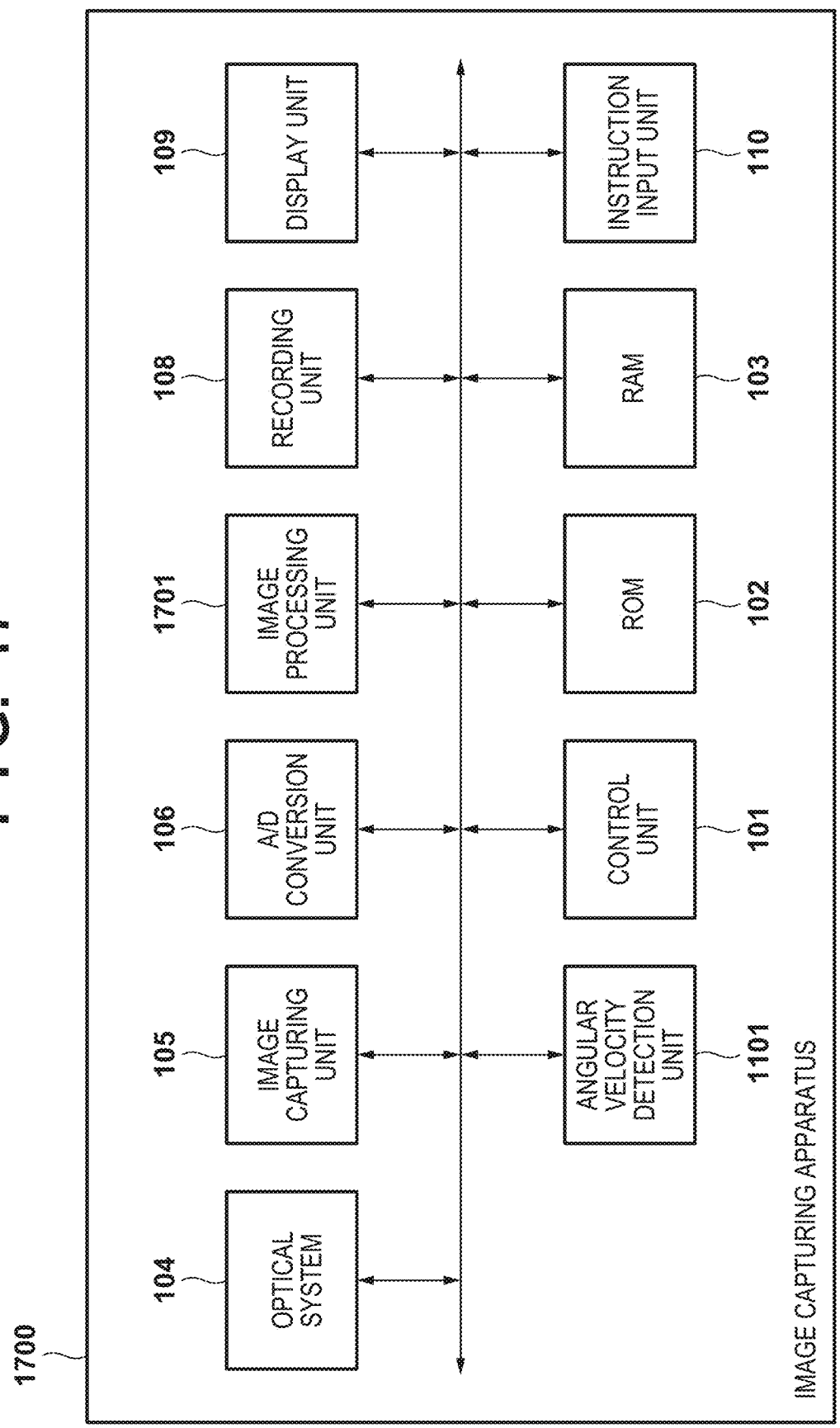
FIG. 17 is a block diagram illustrating the configuration of an image capturing apparatus 1700 including a notifying apparatus.

The image capturing apparatus 1700 illustrated in FIG. 17 differs from the image capturing apparatus 100 illustrated in FIG. 1 in that the angular velocity detection unit 1101 has been added, and the image processing unit 107 has been replaced with an image processing unit 1701.

The angular velocity detection unit 1101 is an angular velocity sensor, for example, which detects the angular velocity of the image capturing apparatus 1700 itself, caused by the user's hand shaking, the user's camerawork, or the like, in the yaw direction and the pitch direction. Any desired known method can be used as the method by which the angular velocity detection unit 1101 detects the angular velocity.

The image processing unit 1701 includes a notification image generating unit 1800 (described later), which generates a motion blur notification image by superimposing an image plane enabling motion blur to be easily confirmed over an image stored in the RAM 103.

Figure 18:
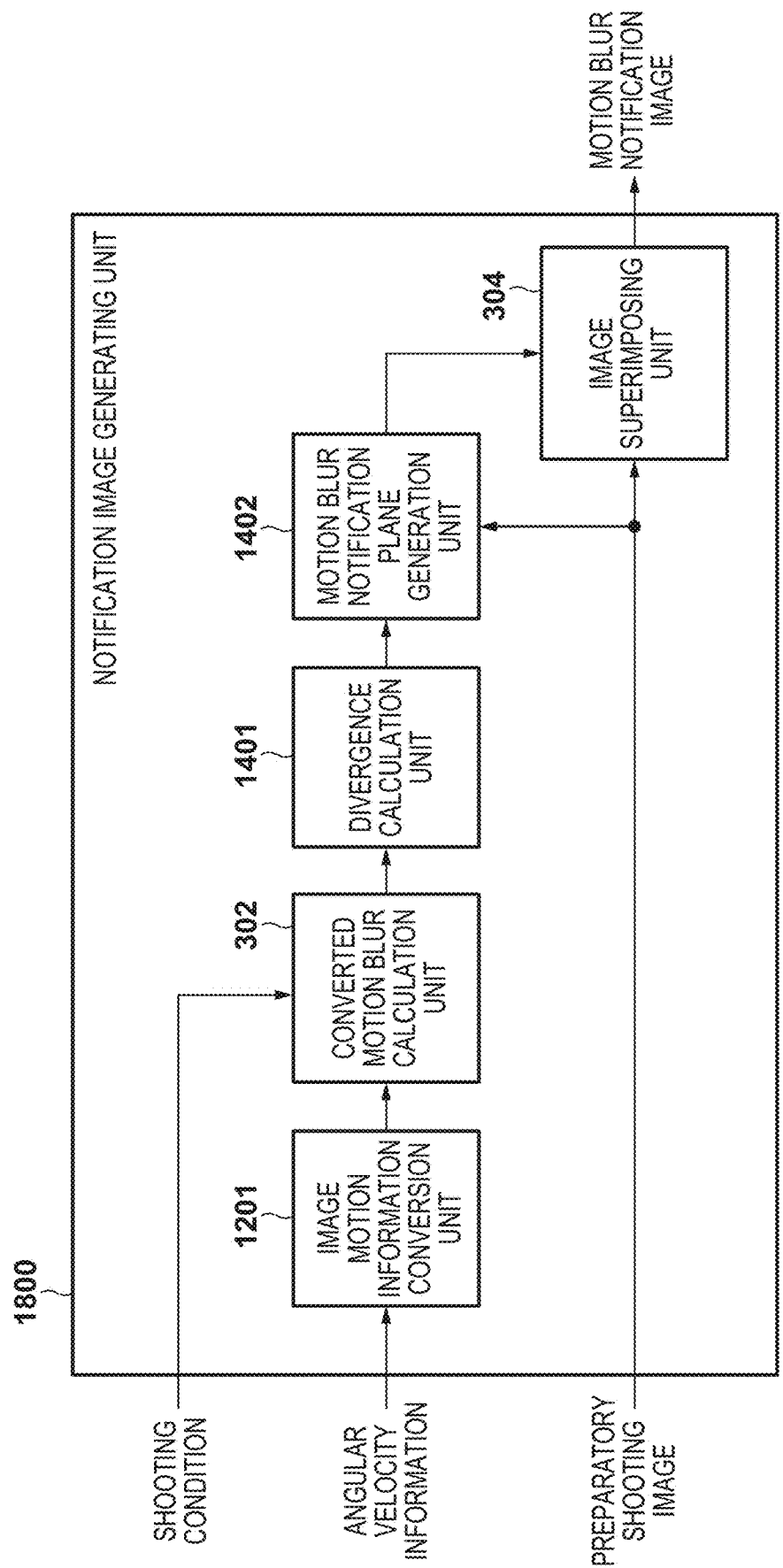
FIG. 18 is a diagram illustrating an example of the configuration of a notification image generating unit 1800 included in an image processing unit 1701.

An example of the configuration of the notification image generating unit 1800 included in the image processing unit 1701 will be described next with reference to FIG. 18. The notification image generating unit 1800 illustrated in FIG. 18 differs from the notification image generating unit 1400 illustrated in FIG. 14 in that the motion vector calculation unit 301 has been replaced with the image motion information conversion unit 1201. The operations of the notification image generating unit 1800 will be described in detail later with reference to FIG. 19.

Figure 19:
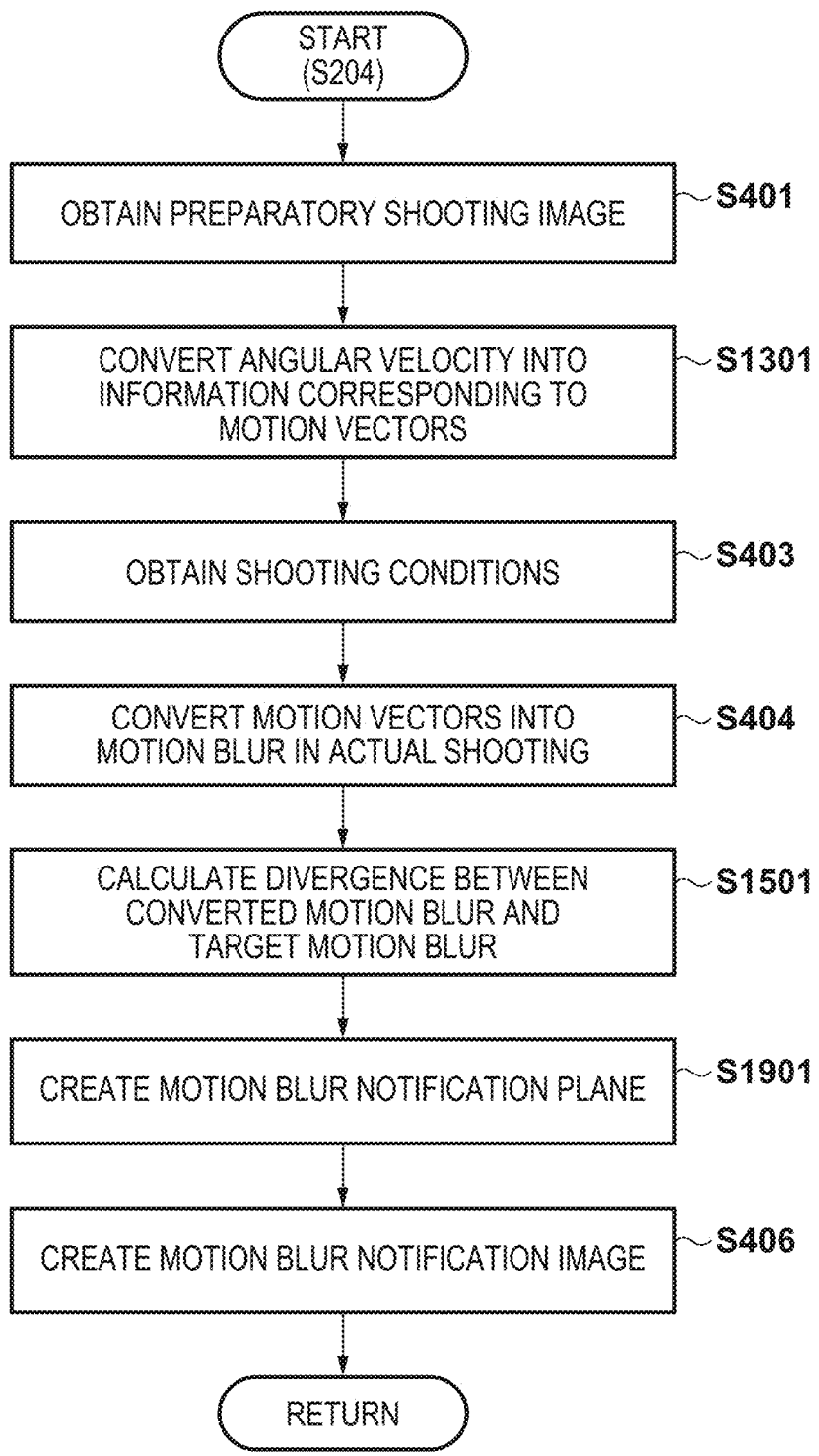
FIG. 19 is a flowchart illustrating a process by which the notification image generating unit 1800 generates a motion blur notification image (step S204 in FIG. 2).

Next, the process by which the notification image generating unit 1800 generates the motion blur notification image (step S204 in FIG. 2) will be described in detail with reference to FIG. 19. In FIG. 19, the processes of steps S401, S403, S404, and S406 are the same as the processes described in the first embodiment with reference to FIG. 4. Additionally, the process of step S1301 is the same as the process described in the second embodiment with reference to FIG. 13. The process of step S1501 is the same as the process described in the third embodiment with reference to FIG. 15.

In step S1901, the motion blur notification plane generation unit 1402 creates an image plane for notifying the user of the motion blur (the motion blur notification plane) on the basis of the converted motion blur calculated in step S404. The process of step S1901 is the same as in the third embodiment (step S1502 in FIG. 15) in that the motion blur notification plane is created with different forms depending on the divergence between the converted motion blur and the target motion blur. However, in the fourth embodiment, the motion vectors are uniform for all of the pixels, and thus the divergence between the converted motion blur and the target motion blur is also uniform for all of the pixels, which means that a histogram such as that illustrated in FIG. 10 cannot be generated. Accordingly, the motion blur notification plane generation unit 1402 determines the form of the motion blur notification plane by, for example, comparing the divergence that is uniform for all of the pixels to one or more thresholds. For example, assume that D represents the divergence, and T1, T2, and T3 represent three thresholds (T1<T2<T3). If T1≤D<T2, the motion blur notification plane generation unit 1402 creates the blue motion blur notification icon 903 (FIG. 9C) as the motion blur notification plane. If T2≤D<T3, the motion blur notification plane generation unit 1402 creates the green motion blur notification icon 902 (FIG. 9B) as the motion blur notification plane. If T3≤D, the motion blur notification plane generation unit 1402 creates the red motion blur notification icon 901 (FIG. 9A) as the motion blur notification plane.

According to the fourth embodiment as described thus far, the image capturing apparatus 1700 converts the motion amount of the image capturing apparatus 1700 carrying out preparatory shooting into the motion blur amount that will arise in the actual shooting. This makes it possible to obtain the converted motion blur with a comparatively light processing load.

Fifth Embodiment

According to Japanese Patent Laid-Open No. 2008-172667, detecting a region of motion between images captured in time series during preparatory shooting, and emphasizing that region of motion, makes it easy to prompt the user to reduce blur.

However, Japanese Patent Laid-Open No. 2008-172667 does not take into account shooting an image at an appropriate framerate, shutter speed, and so on in accordance with the speed, movement amount, and so on of the object, as a way to extract the region of motion between images in time series. For example, detecting motion accurately requires that the moving object be shot without cumulative blur, and to accomplish this, it is necessary to increase the shutter speed. Furthermore, for objects moving at high speeds, the range in which the moving object can be detected is limited as well, and it is therefore necessary to increase the framerate so as to reduce the amount of movement between images. However, carrying out preparatory shooting at a high framerate reduces the quality of the preparatory shooting image, and also consumes more power.

In light of such circumstances, the present embodiment will describe the configuration for striking a desirable balance between the accuracy of motion detection and improvement in the quality of the preparatory shooting image.

In the fifth embodiment, the basic configuration of the image capturing apparatus 100 is the same as in the first embodiment (see FIG. 1). The following will primarily describe points that are different from the first embodiment.

A shooting process executed by the image capturing apparatus 100 will be described with reference to FIG. 20. Unless otherwise specified, the processes in the respective steps of this flowchart are realized by the control unit 101 executing the aforementioned control programs. The processing illustrated in this flowchart starts when the user turns the image capturing apparatus 100 on and an operating mode of the image capturing apparatus 100 enters a shooting mode.

In step S2008, the control unit 101 determines shooting conditions for the preparatory shooting in order to detect the motion amount of an object in the composition. Specifically, the control unit 101 calculates shooting conditions suited to the detection of the motion amount of the object in the composition on the basis of a relationship between the motion amount of the object detected from a preparatory shooting image shot under initial shooting conditions, and a target blur amount (target motion blur) at which a motion blur notification is to be made. The process of step S2008 will be described in detail later with reference to FIG. 21.

Next, the process by which the control unit 101 determines the shooting conditions for preparatory shooting (step S2008 in FIG. 20) will be described in detail with reference to FIG. 21.

In step S2101, the control unit 101 sets the initial shooting conditions in the image capturing unit 105, and captures the preparatory shooting image in a continuous manner. Under the initial shooting conditions, the framerate and the shutter speed are set to the highest (fastest) values within a range that does not affect processing for calculating evaluation values used in the auto function control carried out by a typical camera, such as automatic exposure (AE) and autofocus (AF) control. An appropriate aperture value and ISO sensitivity are also set so that the image can be shot under appropriate exposure conditions using the fast shutter speed which has been set. Accordingly, a moving object in the preparatory shooting image captured under the initial shooting conditions has a comparatively low amount of cumulative blur. There is also a comparatively low amount of movement in the object between the consecutive images. As such, the motion amount can be detected with a high level of accuracy, even for an object moving at high speed. However, the ISO sensitivity is set to a comparatively high value in order to achieve the appropriate exposure conditions, which means that the preparatory shooting image contains a comparatively large amount of noise.

In step S2102, the notification image generating unit 300 calculates motion vectors between the preparatory shooting images shot under the initial shooting conditions, under the control of the control unit 101, so as to calculate a motion amount of the object (the magnitude of the motion vectors). The method for calculating the motion vectors is the same as the calculation method described in the first embodiment with reference to step S402 in FIG. 4.

In step S2103, the control unit 101 specifies a relationship between the motion amount of the object, calculated in step S2102, and the target motion blur. The "target motion blur" is a permissible motion amount at which the motion amount of the object in the captured image does not produce motion blur that stands out. The permissible motion amount is determined on the basis of the size and the number of pixels of the image sensor, which is a CCD, a CMOS sensor, or the like, and the resolution of the display in which the shot image is displayed. For example, if the size of the image sensor is APS-C and the number of pixels is 200,000 pixels, and the resolution of the display is full HD (1920×1080 pixels), the permissible motion amount is assumed to be 5 pixels or less. In this case, adjusting the framerate so that motion less than or equal to 5 pixels can be detected between images makes it possible to detect the motion of the object with an appropriate level of accuracy.

Figure 22A:
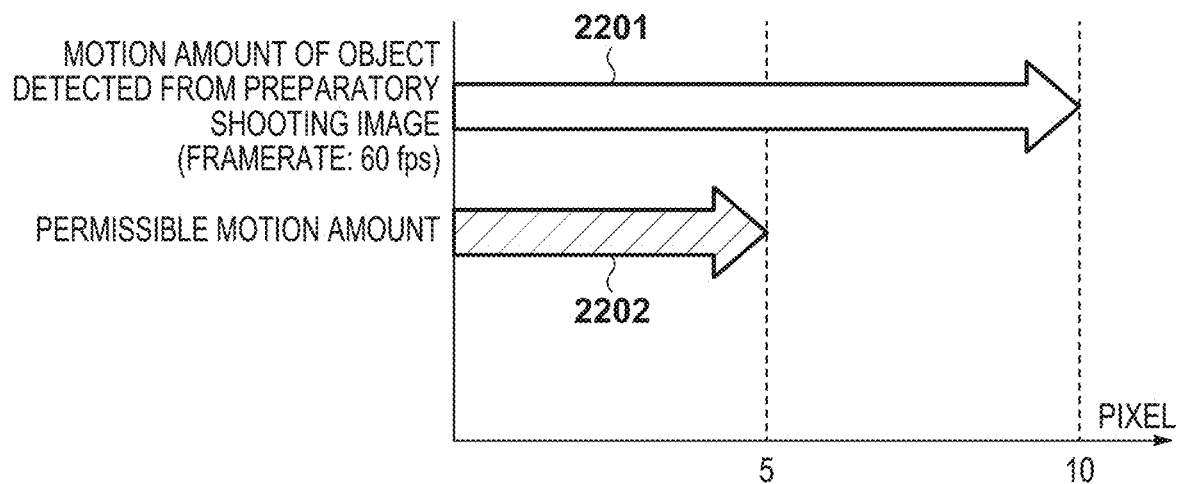
FIGS. 22A and 22B are diagrams illustrating a relationship between a motion amount of an object, calculated from a preparatory shooting image, and a target motion blur (permissible motion amount).
Figure 22B:
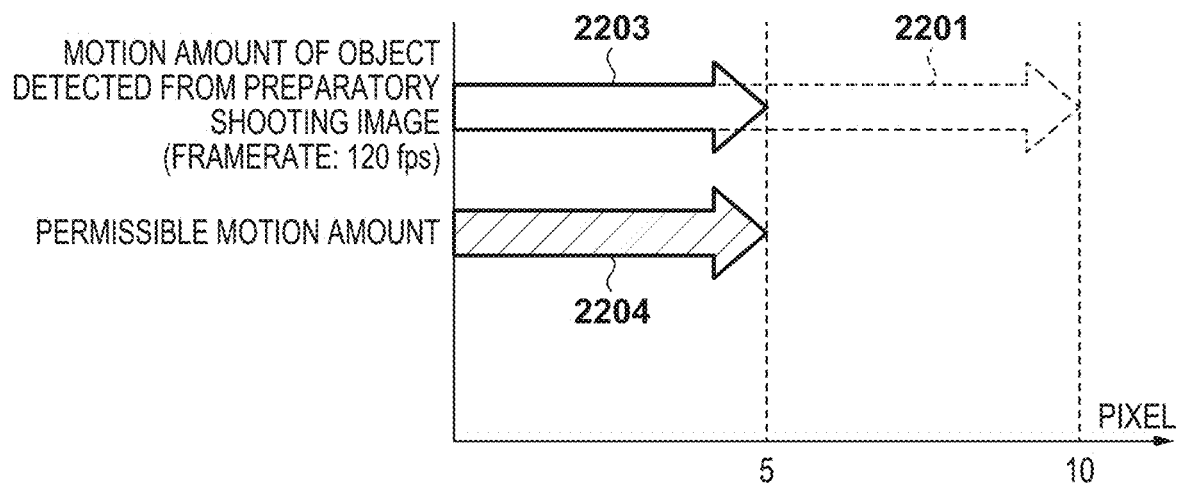

A specific example of the relationship between the motion amount of the object and the target motion blur will be described with reference to FIGS. 22A and 22B. FIGS. 22A and 22B express the relationship between the motion amount of the object, calculated from the preparatory shooting image, and the target motion blur (permissible motion amount), using the magnitude (number of pixels) of motion vectors. FIG. 22A illustrates a state in which the relationship between the motion amount of the object and the target motion blur is not appropriate, whereas FIG. 22B illustrates a state in which the relationship between the motion amount of the object and the target motion blur is appropriate.

The state illustrated in FIG. 22A is a state in which image capturing control for the preparatory shooting image is carried out using a framerate of 60 fps as the initial shooting conditions. At this time, a motion vector 2201 of the object is 10 pixels, and a motion vector 2202 corresponding to the permissible motion amount is 5 pixels, which means that the motion vector 2201 of the object is larger than the motion vector 2202 corresponding to the permissible motion amount. In this case, despite the motion vector 2202 corresponding to the permissible motion amount being 5 pixels, the motion amount of the object can only be detected in units of 10 pixels. This means that there is too much movement in the object for the framerate of 60 fps in the preparatory shooting. In particular, when the object is soft or is undergoing rotational movement, if the motion amount for detection is too coarse (the unit is too great), it becomes difficult to detect the correct motion, which in turn makes it difficult to make a correct motion blur notification and the process for notifying the user of motion blur for the actual shooting (described later).

The state illustrated in FIG. 22B is a state in which image capturing control for the preparatory shooting image is carried out using a framerate of 120 fps as the shooting conditions. At this time, a motion vector 2203 of the object is 5 pixels, and a motion vector 2204 corresponding to the permissible motion amount is 5 pixels, which means that the motion vector 2203 of the object indicates the same movement amount as the motion vector 2204 corresponding to the permissible motion amount. In other words, it can be seen that the motion amount can be detected at the appropriate unit (that is, units of 5 pixels) at 120 fps. Thus if the motion vectors can be detected at units less than or equal to the permissible motion amount in this manner, whether or not the motion blur in the actual shooting will exceed the permissible motion amount can be determined with a high level of accuracy.

Expressing the conditions for detecting motion with a high level of accuracy as a relational expression between the motion blur of the object and the target motion amount results in the following Equation (8).

$$n = \text{magnitude of motion vector/permissible motion amount} \quad (8)$$

Here, n being greater than 1 indicates that the unit at which the motion amount can be detected is too high, whereas n being less than or equal to 1 indicates that the motion amount can be detected at the appropriate unit.

In addition to a method in which the permissible motion amount is set in advance in consideration of the accuracy of the detection of the motion blur during the actual shooting, the permissible motion amount can also be determined in response to user instructions. Alternatively, the permissible motion amount can be determined in accordance with the amount of motion blur after converting the length of the detected motion vectors into a magnitude of motion vectors corresponding to the shutter speed for the actual shooting, which will be described later.

Returning to FIG. 21, in step S2104, the control unit 101 calculates the shooting conditions at which the motion amount can be detected at the appropriate unit, on the basis of the relationship between the motion amount of the object and the target motion blur specified in step S2103; then, the shooting conditions for the preparatory shooting are changed to the calculated shooting conditions. The control unit 101 then controls the image capturing unit 105 to carry out the preparatory shooting under the post-change shooting conditions.

Note that the appropriate shooting conditions for detecting motion are not necessarily achieved simply by increasing the framerate. If the framerate is too high, the exposure time will be shortened, resulting in images that contain a high amount of noise, particularly for dark locations; in this case, it is possible that adverse effects will arise with respect to detecting motion, such as the inability to accurately determine the signals from the object. As such, the "appropriate shooting conditions for detecting motion" correspond to an exposure that is as long as possible, within an exposure time at which the motion amount can be detected at a unit less than or equal to the permissible motion amount, and at which that motion amount can be detected.

Accordingly, the control unit 101 calculates the framerate and the shutter speed, which are the primary factors in the shooting conditions, using Equations (9) and (10).

$$\text{framerate(fps)} = \text{initial framerate} \times n \quad (9)$$

$$\text{shutter speed}(s) = \text{initial shutter speed} \times 1/n \quad (10)$$

Here, n is a value determined through the aforementioned Equation (8).

The framerate and shutter speed calculated in this manner are important shooting conditions for detecting movement. Additionally, to capture an image of the appropriate brightness, the control unit 101 also carries out control for changing the aperture value and the ISO sensitivity in accordance with the changes made to the framerate and the shutter speed, so that the exposure value does not change.

According to Equations (9) and (10), when n is less than 1, as in the examples illustrated in FIGS. 22A and 22B, the framerate and shutter speed both increase. Accordingly, the motion amount can be detected at a unit necessary for detecting the motion with a high level of accuracy. Additionally, according to Equations (9) and (10), when n is less than 1, the framerate and shutter speed both decrease. Accordingly, situations where the framerate and shutter speed are increased more than is necessary, resulting in a drop in the quality of the preparatory shooting image, can be suppressed.

Note that there are cases where the framerates that can be set by the control unit 101 have discrete values. Thus, to be more exact, the control unit 101 does not need to set the initial framerate to strictly n times, but rather may set the initial framerate to approximately n times (approximately (motion amount)/(target motion blur amount) times). The range indicated by "approximately" is determined as appropriate in accordance with the framerate values that can be set by the control unit 101. The same applies to the shutter speed, and thus the control unit 101 may set the initial shutter speed to approximately 1/n times.

Furthermore, the control unit 101 may change the initial framerate to a value higher (or lower) that approximately n times. Even in this case, changing the framerate of the preparatory shooting on the basis of a difference between the magnitude of the motion vectors (the motion amount) and the permissible motion amount (the target motion blur amount) makes it possible to achieve the desired balance between improving the accuracy of the motion detection and improving the quality of the preparatory shooting image.

Figure 20:
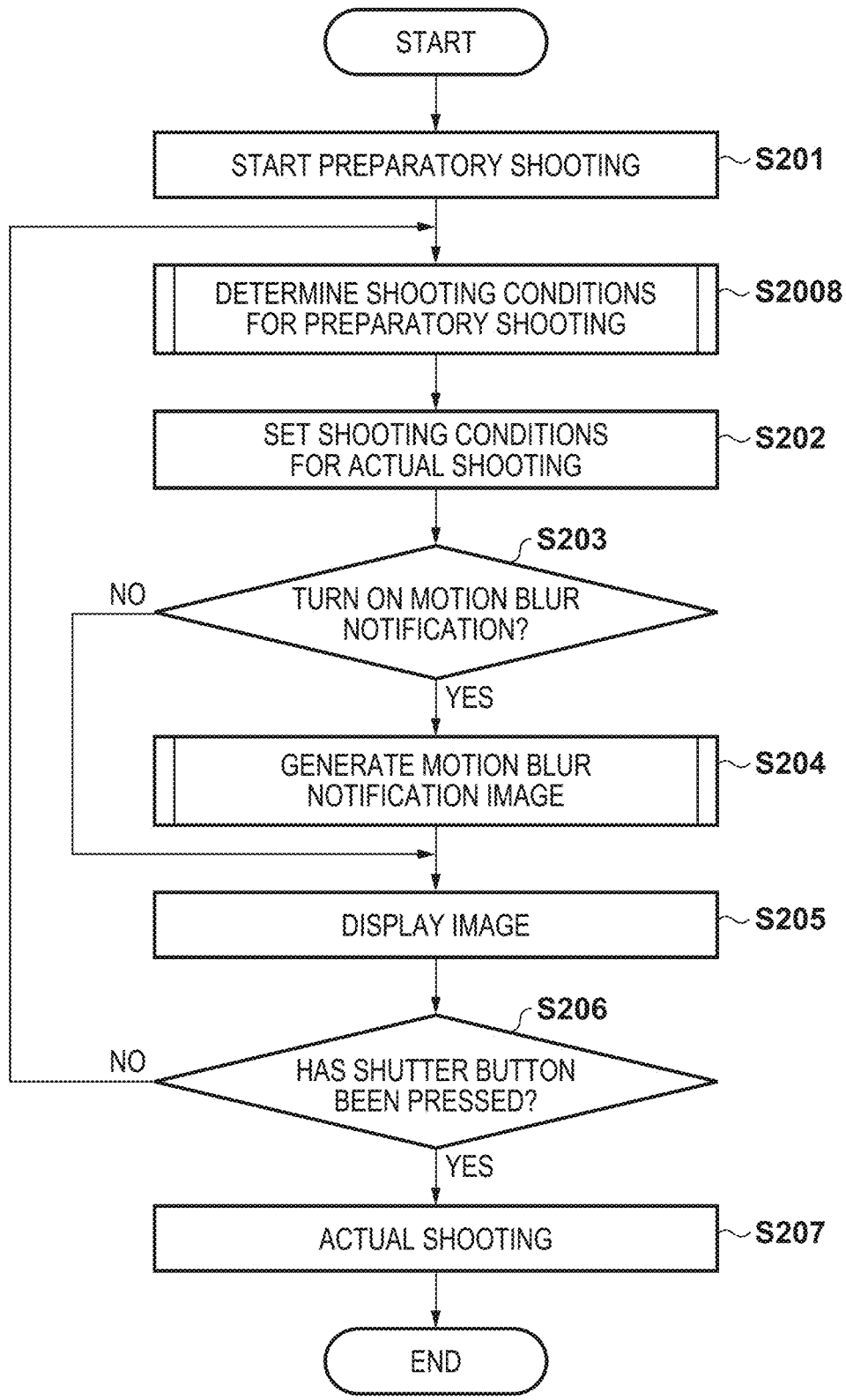
FIG. 20 is a flowchart illustrating a shooting process according to a fifth embodiment.
Figure 21:
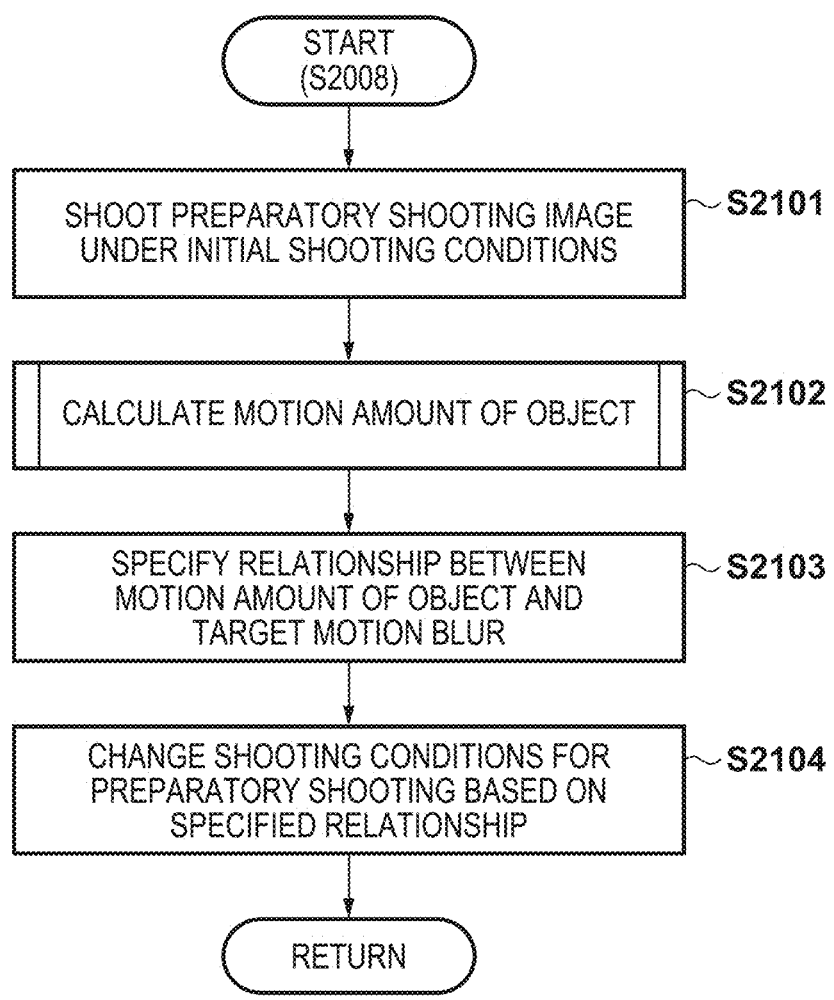
FIG. 21 is a flowchart illustrating a process by which a control unit 101 determines shooting conditions for preparatory shooting (step S2008 in FIG. 20).
Figure 23A:
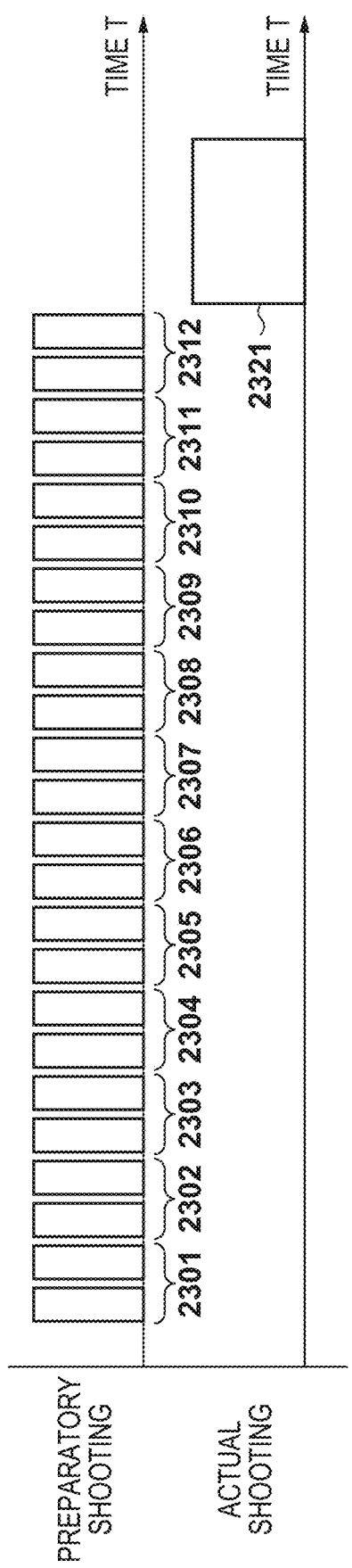
FIGS. 23A and 23B are timing charts illustrating a process by which the control unit 101 determines shooting conditions for preparatory shooting (step S2008 in FIG. 20).
Figure 23B:
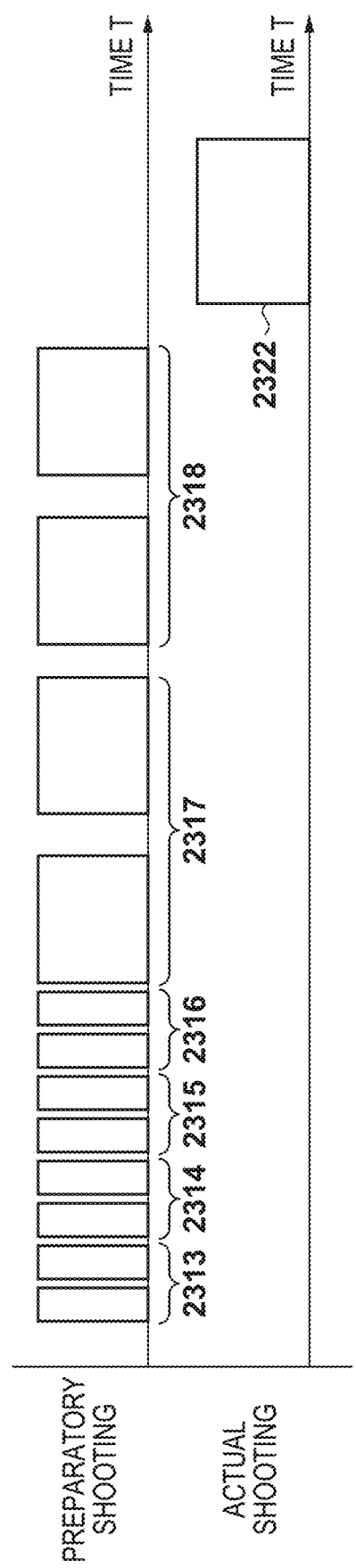

FIGS. 23A and 23B are timing charts illustrating a process by which the control unit 101 determines shooting conditions for preparatory shooting (step S2008 in FIG. 20). FIGS. 23A and 23B indicate the timings of the preparatory shooting and the actual shooting. FIG. 23A illustrates the timings of the preparatory shooting and the actual shooting when the process of step S2008 is not carried out, whereas FIG. 23B illustrates the timings of the preparatory shooting and the actual shooting when the process of step S2008 is carried out. Reference signs 2301 to 2318 indicate pairs of sequential and adjacent images necessary for detecting motion.

In the case of FIG. 23A (when the process of step S2008 is not carried out), the control unit 101 carries out preparatory shooting continuously at a fixed, high framerate, for example. In other words, the control unit 101 continuously detects the motion amount of the object between the adjacent preparatory shooting images shot under the initial shooting conditions (reference signs 2301 to 2312), until the actual shooting is carried out. Upon detecting that the user has depressed the shutter button, the control unit 101 carries out the actual shooting (reference sign 2321).

On the other hand, in the case illustrated in FIG. 23B (when the process of step S2008 is carried out), the preparatory shooting is carried out under the initial shooting conditions until the timings indicated by reference signs 2313 to 2316, in the same manner as the timings indicated by the reference signs 2301 to 2304. However, due to the process of step S2008, the shooting conditions for the preparatory shooting are changed on the basis of the relationship between the motion amount of the object and the target motion blur, and thus the preparatory shooting is carried out under the post-change shooting conditions at the timings indicated by reference signs 2317 and 2318. Although FIG. 22B illustrates an example in which the frame rate increases, FIG. 23B illustrates an example in which the framerate decreases. The actual shooting (reference sign 2322) is carried out thereafter.

The processes following step S2008 are the same as those described in the first embodiment (FIG. 2). However, in the process for converting the motion vectors from the preparatory shooting into the motion blur that will arise in the actual shooting (step S404 of FIG. 4, which is a part of step S204), the motion vectors from the preparatory shooting are motion vectors corresponding to the shooting conditions changed by the process of step S2008. As such, when, for example, the change has been made as indicated in FIG. 22B, the conversion is carried out as indicated in FIG. 24 (instead of FIG. 8). If it is determined in step S206 that the shutter button has not been pressed, the process returns to step S2008. In this case, in step S2101 of FIG. 21, the shooting conditions that have been changed as a result of the processing in the previous step S2008 are used instead of the initial shooting conditions.

Note that with respect to the determination (change) of the shooting conditions in step S2008, the control unit 101 may be configured to change the conditions upon detecting that the motion of the object is in a stable state. Additionally, the control unit 101 may, on the basis of changes in the motion vectors, determine whether the motion of the object is in a stable state after the shooting conditions for the preparatory shooting have been changed once, and may then change the shooting conditions for the preparatory shooting again if the amount of change in the motion vectors per unit of time has increased. In other words, if a change has occurred in the motion amount detected from the preparatory shooting image after the shooting conditions such as the framerate have been changed, the control unit 101 may change the shooting conditions such as the framerate again.

According to the fifth embodiment as described above, the image capturing apparatus 100 changes the framerate for the preparatory shooting on the basis of a difference between the motion amount detected from the preparatory shooting image, and the target motion blur amount. This makes it possible to achieve the desired balance between improving the accuracy of the motion detection and improving the quality of the preparatory shooting image.

Note that by combining the configuration of the third embodiment with the configuration of the present embodiment, the user can be notified of motion blur using three colors (red, green, and blue) depending on the amount of converted motion blur. In this case, the control unit 101 sets the permissible motion amount so that the narrowest range of the motion amount can be detected, so that it is possible to express the range of the motion amount represented by each color. For example, if the colors representing the motion blur relative to the magnitude of the motion vectors are 0 to 10 pixels for blue, 11 to 15 pixels for green, and 16 pixels or more for red, the range for green is the narrowest section as a motion amount. As such, the control unit 101 sets 5 pixels, i.e., the range for green (11 to 15), as the permissible motion amount.

Although the present embodiment describes an example in which the framerate and the shutter speed are changed as the shooting conditions for the preparatory shooting in order to detect motion, it is also possible to change only one of these conditions.

Additionally, a configuration may be employed in which the permissible motion amount is set as the magnitude of motion vectors within a range that does not exceed a limit range for motion detection, in a situation where the user has not intentionally determined the permissible motion amount. At this time, it is necessary to determine whether the motion of the object has exceeded the range for motion detection. Using an SAD value during motion detection to detect whether an amount of change has dropped below a predetermined value, measuring motion of the image capturing apparatus 100 itself using gyro information of the like, and so on can be used as methods to make this determination. If it is determined that the permissible motion amount has been exceeded, the control unit 101 carries out control for increasing the shutter speed, the framerate, or the like.

Furthermore, if the object is moving quickly and the framerate for the preparatory shooting cannot be changed, the control unit 101 may reduce the shutter speed only, within a range that does not lead to a drop in the framerate.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-248373, filed Dec. 28, 2018 which is hereby incorporated by reference herein in its entirety.

What is claimed is:

1. A notifying apparatus comprising at least one processor and/or at least one circuit which functions as:
　a detecting unit configured to detect a motion amount of one or more objects within an image captured by an image capturing apparatus carrying out a first shooting that is carried out repeatedly, the motion amount of said one or more objects being detected by comparing a plurality of partial image regions of a base image and a reference image captured at the first shooting at predetermined intervals of time;
　a converting unit configured to convert the motion amount of the one or more objects within the image captured at the first shooting into a motion blur amount for said one or more objects that will arise in a second shooting, on the basis of an exposure time used in the first shooting and an exposure time used in the second shooting; and a notifying unit configured to make a notification of the motion blur on the basis of the motion blur amount for said one or more objects within the captured image, wherein the notifying unit changes a form of the notification in accordance with a magnitude of the motion blur amount for said one or more objects that will arise in the second shooting.

2. The notifying apparatus according to claim 1, wherein the at least one processor and/or at least one circuit is further configured to function as:

a display unit configured to display the image obtained from the first shooting, wherein the notifying unit controls the display unit to display an icon having a different appearance depending on the magnitude of the motion blur amount for said one or more objects that will arise in the second shooting along with the image.

3. The notifying apparatus according to claim 2, wherein the notifying unit changes at least one of a color and size of the icon in accordance with the magnitude of the motion blur amount for said one or more objects that will arise in the second shooting.

4. The notifying apparatus according to claim 1, wherein the at least one processor and/or at least one circuit is further configured to function as:

a display unit configured to display the image obtained from the first shooting, wherein the notifying unit controls the display unit to display a plurality of frames surrounding a plurality of partial regions where motion blur is arising in the image, along with the image, and changes an appearance of each frame in accordance with the magnitude of the motion blur amount of the one or more objects in the partial region corresponding to that frame.

5. The notifying apparatus according to claim 4, wherein the notifying unit changes at least one of a color and a thickness of each frame in accordance with the magnitude of the motion blur amount of the one or more objects in the partial region corresponding to that frame.

6. The notifying apparatus according to claim 1, wherein the at least one processor and/or at least one circuit is further configured to function as:

a display unit configured to display the image obtained from the first shooting, wherein the notifying unit controls the display unit to display a plurality of edge regions where motion blur is arising for the one or more objects in the image in an enhanced manner with different appearances depending on the magnitude of the motion blur amount for the one or more objects in each of those edge regions.

7. The notifying apparatus according to claim 6, wherein the enhanced display includes at least one of displaying the plurality of edge regions with different colors depending on the magnitude of the motion blur amount for the one or more objects in each of those edge regions, and displaying the plurality of edge regions with lines of different thicknesses depending on the magnitude of the motion blur amount for the one or more objects in each of those edge regions.

8. An image capturing apparatus comprising:

the notifying apparatus according to claim 1; and an image sensor.

9. A notifying method executed by a notifying apparatus, comprising:

detecting a motion amount of one or more objects within an image captured by an image capturing apparatus carrying out a first shooting that is carried out repeatedly, the motion amount of said one or more objects being detected by comparing a plurality of partial image regions of a base image and a reference image captured at the first shooting at predetermined intervals of time;

converting the motion amount of the one or more objects within the image captured at the first shooting into a motion blur amount for said one or more objects that will arise in a second shooting, on the basis of an exposure time used in the first shooting and an exposure time used in the second shooting; and making a notification of motion blur on the basis of the motion blur amount for said one or more objects within the captured image, wherein a form of the notification is changed in accordance with a magnitude of the motion blur amount for said one or more objects that will arise in the second shooting.

10. A non-transitory computer-readable storage medium which stores a program for causing a computer to execute a notifying method comprising:

detecting a motion amount of one or more objects within an image captured by an image capturing apparatus carrying out a first shooting that is carried out repeatedly, the motion amount of said one or more objects being detected by comparing a plurality of partial image regions of a base image and a reference image captured at the first shooting at predetermined intervals of time;

converting the motion amount of the one or more objects within the image captured at the first shooting into a motion blur amount for said one or more objects that will arise in a second shooting, on the basis of an exposure time used in the first shooting and an exposure time used in the second shooting; and making a notification of motion blur on the basis of the motion blur amount for said one or more objects within the captured image, wherein a form of the notification is changed in accordance with a magnitude of the motion blur amount for said one or more objects that will arise in the second shooting.

* * * * *